US012068856B2

(12) United States Patent
Sarkis et al.

(10) Patent No.: US 12,068,856 B2
(45) Date of Patent: Aug. 20, 2024

(54) GROUP FEEDBACK TECHNIQUES IN WIRELESS SYSTEMS

(71) Applicant: QUALCOMM Incorporated, San Diego, CA (US)

(72) Inventors: Gabi Sarkis, San Diego, CA (US); Jing Lei, San Diego, CA (US); Seyong Park, San Diego, CA (US); Ying Wang, San Diego, CA (US); Naga Bhushan, San Diego, CA (US); Chih-Ping Li, San Diego, CA (US); Joseph Binamira Soriaga, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 16/534,301

(22) Filed: Aug. 7, 2019

(65) Prior Publication Data
US 2020/0052825 A1    Feb. 13, 2020

Related U.S. Application Data

(60) Provisional application No. 62/717,414, filed on Aug. 10, 2018.

(51) Int. Cl.
*H04L 1/1607*    (2023.01)
*H04L 5/00*    (2006.01)
(Continued)

(52) U.S. Cl.
CPC .......... *H04L 1/1621* (2013.01); *H04L 5/0055* (2013.01); *H04W 72/121* (2013.01); *H04W 72/23* (2023.01); *H04W 72/044* (2013.01)

(58) Field of Classification Search
CPC ..................................................... H04L 1/1621
See application file for complete search history.

(56) References Cited

U.S. PATENT DOCUMENTS 9,820,302 B2 * 11/2017 Choi ..................... H04W 72/02
10,305,637 B2 * 5/2019 Kim ..................... H04L 1/1861
(Continued)

FOREIGN PATENT DOCUMENTS

CN    108023706 A    5/2018

OTHER PUBLICATIONS

International Search Report and Written Opinion—PCT/US2019/045750—ISA/EPO—Nov. 12, 2019.

*Primary Examiner* — Guang W Li
(74) *Attorney, Agent, or Firm* — Holland & Hart LLP

(57) ABSTRACT

Methods, systems, and devices for wireless communications are described. A user equipment (UE) or multiple UEs may transmit a grant-free uplink transmission to a base station. The base station may monitor resources for the grant-free uplink transmission (e.g., from one or more UEs) and the base station may generate a group feedback message corresponding to whether the base station successfully received the uplink transmission(s). The group feedback message may contain feedback for multiple uplink transmissions from one or multiple UEs. The group feedback message may be transmitted to a UE over a downlink shared channel or a downlink control channel and the UE may receive the group feedback message and may determine whether to retransmit the uplink transmission based on the group feedback message.

28 Claims, 16 Drawing Sheets

(51) Int. Cl.
  *H04W 72/121* (2023.01)
  *H04W 72/23* (2023.01)
  *H04W 72/044* (2023.01)

(56) References Cited

U.S. PATENT DOCUMENTS

| | | | | |
|---|---|---|---|---|
| 10,389,490 B2* | 8/2019 | Sun | | H04L 1/1812 |
| 10,693,596 B2* | 6/2020 | Liu | | H04L 1/16 |
| 10,924,225 B2* | 2/2021 | Tsai | | H04W 72/042 |
| 2009/0046793 A1* | 2/2009 | Love | | H04L 1/1607 |
| | | | | 375/260 |
| 2009/0109906 A1* | 4/2009 | Love | | H04L 1/0026 |
| | | | | 370/329 |
| 2009/0323564 A1* | 12/2009 | Chiu | | H04L 1/1896 |
| | | | | 370/280 |
| 2010/0031110 A1* | 2/2010 | Seok | | H04L 1/1621 |
| | | | | 714/748 |
| 2010/0054188 A1* | 3/2010 | Matsumoto | | H04L 1/1671 |
| | | | | 370/328 |
| 2011/0032925 A1* | 2/2011 | Lee | | H04L 1/1621 |
| | | | | 370/345 |
| 2011/0200016 A1* | 8/2011 | Bergman | | H04L 1/1614 |
| | | | | 370/335 |
| 2013/0223318 A1* | 8/2013 | Liu | | H04L 1/1812 |
| | | | | 370/312 |
| 2017/0222781 A1* | 8/2017 | Han | | H04L 5/0053 |
| 2017/0288817 A1* | 10/2017 | Cao | | H04L 1/1812 |
| 2017/0295006 A1* | 10/2017 | Han | | H04L 5/0055 |
| 2018/0041917 A1* | 2/2018 | Xi | | H04L 5/0082 |
| 2018/0123742 A1* | 5/2018 | Yi | | H04L 1/08 |
| 2018/0123765 A1* | 5/2018 | Cao | | H04L 1/1819 |
| 2018/0227905 A1* | 8/2018 | Zhou | | H04W 4/70 |
| 2018/0241510 A1* | 8/2018 | Shen | | H04L 1/18 |
| 2018/0294924 A1* | 10/2018 | Jeon | | H04L 5/14 |
| 2018/0317213 A1* | 11/2018 | Islam | | H04L 1/1812 |
| 2019/0132756 A1* | 5/2019 | Okada | | H04L 43/16 |
| 2020/0022174 A1* | 1/2020 | Karaki | | H04L 1/1812 |
| 2020/0052825 A1* | 2/2020 | Sarkis | | H04W 72/121 |
| 2020/0067652 A1* | 2/2020 | Liu | | H04L 5/00 |
| 2020/0274656 A1* | 8/2020 | Gordaychik | | H04L 1/1854 |
| 2020/0280397 A1* | 9/2020 | Gao | | H04L 5/0055 |
| 2021/0014879 A1* | 1/2021 | Bae | | H04L 27/2607 |
| 2021/0111835 A1* | 4/2021 | Khoshnevisan | | H04L 5/0055 |
| 2021/0111838 A1* | 4/2021 | Utkovski | | H04L 1/1812 |
| 2021/0282118 A1* | 9/2021 | Zuo | | H04L 1/1893 |
| 2021/0336728 A1* | 10/2021 | Selvanesan | | H04L 1/1896 |
| 2022/0209925 A1* | 6/2022 | Jung | | H04W 72/044 |

\* cited by examiner

GROUP FEEDBACK TECHNIQUES IN WIRELESS SYSTEMS

CROSS REFERENCE

The present application for patent claims the benefit of U.S. Provisional Patent Application No. 62/717,414 by SARKIS et al., entitled "GROUP FEEDBACK TECHNIQUES IN WIRELESS SYSTEMS," filed Aug. 10, 2018, assigned to the assignee hereof, and expressly incorporated herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (OFDM) (DFT-s-OFDM). A wireless multiple-access communications system may include a number of base stations or network access nodes, each simultaneously supporting communication for multiple communication devices, which may be otherwise known as user equipment (UE).

Some wireless communications systems may implement grant-free uplink transmissions. Grant-free uplink transmissions may be transmitted without requiring a corresponding grant message in a downlink transmission (e.g., a physical downlink control channel (PDCCH) message scheduling the uplink transmission over specified resources). Transmitting grant-free uplink transmissions may make available resources that may be traditionally reserved for the corresponding grant messages.

Wireless communications systems that implement grant-free uplink transmissions, however, may not have dedicated resources for feedback associated with the grant-free uplink transmissions. If a base station is unable to detect a grant-free uplink transmission, the base station may not identify that the grant-free uplink transmission was transmitted. Further, the UE that transmitted the grant-free uplink transmission may have no knowledge of the failed detection by the base station, and may thus assume that the grant-free uplink transmission was successfully received by the base station. This may cause reliability or latency issues for systems that support grant-free communications.

SUMMARY

The described techniques relate to improved methods, systems, devices, and apparatuses that support group feedback techniques in wireless systems. Generally, the described techniques allow a base station to generate a group feedback message in response to an uplink transmission. For example, a user equipment (UE) may transmit an uplink transmission to a base station. In some cases, the uplink transmission may include or may be a grant-free uplink transmission. In other cases, the uplink transmission may include or may be a grant-based uplink transmission. The base station may monitor uplink resources for the uplink transmission (e.g., from one or more UEs) and may generate a group feedback message based on the monitoring. In some cases, the group feedback message may bundle feedback corresponding to uplink transmissions from multiple UEs or multiple uplink transmissions and the group feedback message may indicate whether the base station successfully received one or more of the grant-free uplink transmission(s).

The group feedback message may be received via a downlink channel (e.g., a physical downlink control channel (PDCCH) or physical downlink shared channel (PDSCH)), and the UE may identify from the group feedback message, the location of the feedback for the uplink transmission based on different factors (e.g., frequency allocation, time allocation, bandwidth part (BWP)). If the UE determines the feedback for the uplink transmission is a negative acknowledgment (NACK), the UE may retransmit the uplink transmission to the base station. Such techniques may allow a base station to provide feedback for uplink transmissions without configuration of a dedicated channel for feedback (e.g., a Physical Hybrid Automatic Repeat Request (HARD) Indicator Channel (PHICH)).

A method of wireless communications at a base station is described. The method may include monitoring a set of time-frequency resources for one or more uplink transmissions from a set of UEs in communication with the base station, generating a group feedback message for the set of UEs, where the group feedback message includes an indication of whether an uplink transmission was received from each UE of the set of UEs based on the monitoring, and transmitting the group feedback message to the set of UEs.

An apparatus for wireless communications at a base station is described. The apparatus may include a processor, memory in electronic communication with the processor, and instructions stored in the memory. The instructions may be executable by the processor to cause the apparatus to monitor a set of time-frequency resources for one or more uplink transmissions from a set of UEs in communication with the base station, generate a group feedback message for the set of UEs, where the group feedback message includes an indication of whether an uplink transmission was received from each UE of the set of UEs based on the monitoring, and transmit the group feedback message to the set of UEs.

Another apparatus for wireless communications at a base station is described. The apparatus may include means for monitoring a set of time-frequency resources for one or more uplink transmissions from a set of UEs in communication with the base station, generating a group feedback message for the set of UEs, where the group feedback message includes an indication of whether an uplink transmission was received from each UE of the set of UEs based on the monitoring, and transmitting the group feedback message to the set of UEs.

A non-transitory computer-readable medium storing code for wireless communications at a base station is described. The code may include instructions executable by a processor to monitor a set of time-frequency resources for one or more uplink transmissions from a set of UEs in communication with the base station, generate a group feedback message for the set of UEs, where the group feedback message includes an indication of whether an uplink transmission was received from each UE of the set of UEs based on the monitoring, and transmit the group feedback message to the set of UEs.

In some examples of the method, apparatuses, and non-transitory computer-readable medium described herein, the one or more uplink transmissions include one or more grant-free uplink transmissions.

In some examples of the method, apparatuses, and non-transitory computer-readable medium described herein, generating the group feedback message may include operations, features, means, or instructions for generating a bitmap that indicates feedback information for each UE of the set of UEs, where each location of the bitmap corresponds to a respective UE of the set of UEs or multiple UEs of the set of UEs.

Some examples of the method, apparatuses, and non-transitory computer-readable medium described herein may further include operations, features, means, or instructions for configuring a first location of the bitmap for a first UE of the set of UEs and transmitting a control message to the first UE, the control message indicating that the first location of the bitmap may be configured for the first UE. Some examples of the method, apparatuses, and non-transitory computer-readable medium described herein may further include operations, features, means, or instructions for identifying a UE identifier (ID) for a first UE of the set of UEs, where a first location of the bitmap may be configured for the first UE based on the UE ID.

In some examples of the method, apparatuses, and non-transitory computer-readable medium described herein, the UE ID includes a cell radio network temporary ID (C-RNTI) or a configured scheduling radio network temporary ID (CS-RNTI). Some examples of the method, apparatuses, and non-transitory computer-readable medium described herein may further include operations, features, means, or instructions for calculating a hash function or a modulo function based on the UE ID, where the first location may be based on the hash function or the modulo function.

Some examples of the method, apparatuses, and non-transitory computer-readable medium described herein may further include operations, features, means, or instructions for receiving an uplink shared channel transmission from a first UE of the set of UEs based on the monitoring and determining a location within the bitmap for feedback for the first UE based on the uplink shared channel transmission.

Some examples of the method, apparatuses, and non-transitory computer-readable medium described herein may further include operations, features, means, or instructions for determining the location within the bitmap based on a frequency allocation for the uplink shared channel, a time allocation for the uplink shared channel, a BWP associated with the uplink shared channel, a transmission signature of the uplink shared channel, a UE ID of the first UE, or any combination thereof.

Some examples of the method, apparatuses, and non-transitory computer-readable medium described herein may further include operations, features, means, or instructions for determining that an uplink shared channel transmission was not received over the set of time-frequency resources from a first UE of the set of UEs based on the monitoring and transmitting a NACK indication to the first UE in the bitmap. Some examples of the method, apparatuses, and non-transitory computer-readable medium described herein may further include operations, features, means, or instructions for receiving a retransmission from the first UE over the set of time-frequency resources in response to the NACK indication.

Some examples of the method, apparatuses, and non-transitory computer-readable medium described herein may further include operations, features, means, or instructions for transmitting an uplink grant to the first UE, the uplink grant conveying a grant for retransmission and receiving the retransmission from the first UE in response to the uplink grant. Some examples of the method, apparatuses, and non-transitory computer-readable medium described herein may further include operations, features, means, or instructions for receiving a retransmission from the first UE over a second set of time-frequency resources different from the set of time-frequency resources in response to the NACK indication.

In some examples of the method, apparatuses, and non-transitory computer-readable medium described herein, the second set of time-frequency resources may be based on a location of the NACK indication within the bitmap. Some examples of the method, apparatuses, and non-transitory computer-readable medium described herein may further include operations, features, means, or instructions for transmitting a control message to the first UE that indicates the second set of time-frequency resources.

Some examples of the method, apparatuses, and non-transitory computer-readable medium described herein may further include operations, features, means, or instructions for receiving a retransmission from the first UE in response to the NACK indication, where the retransmission may be based on a BWP associated with the uplink shared channel transmission.

In some examples of the method, apparatuses, and non-transitory computer-readable medium described herein, generating the group feedback message may include operations, features, means, or instructions for generating an acknowledgment (ACK) bitmap that indicates ACK feedback information for the set of UEs and generating a NACK bitmap that indicates NACK feedback information for the set of UEs.

In some examples of the method, apparatuses, and non-transitory computer-readable medium described herein, generating the group feedback message may include operations, features, means, or instructions for generating a detection bitmap that indicates whether detecting of the one or more uplink transmissions from the set of UEs was successful.

In some examples of the method, apparatuses, and non-transitory computer-readable medium described herein, generating the group feedback message may include operations, features, means, or instructions for generating a first bitmap that indicates feedback information for each UE of the set of UEs, where each location of the first bitmap corresponds to a respective UE of the set of UEs and generating a second bitmap that indicates feedback information for each UE of the set of UEs, where each location of the second bitmap corresponds to a respective transmission from the set of UEs.

In some examples of the method, apparatuses, and non-transitory computer-readable medium described herein, transmitting the group feedback message may include operations, features, means, or instructions for transmitting a downlink control channel that includes the group feedback message. In some examples of the method, apparatuses, and non-transitory computer-readable medium described herein, the downlink control channel may be transmitted according to a set of transmission parameters different from other downlink control channels.

In some examples of the method, apparatuses, and non-transitory computer-readable medium described herein, the set of transmission parameters includes a control resource set, a search space, a monitoring occasion, a set of configured control resources, or any combination thereof. Some examples of the method, apparatuses, and non-transitory computer-readable medium described herein may further include operations, features, means, or instructions for transmitting a control message to the set of UEs, where the control message indicates a UE configuration for an absence of the group feedback message.

Some examples of the method, apparatuses, and non-transitory computer-readable medium described herein may further include operations, features, means, or instructions for transmitting the downlink control channel according to an aggregation level configuration, where the aggregation level configuration may be indicated via a control message, a maximum of a set of preconfigured aggregation levels, a default aggregation level, or any combination thereof.

Some examples of the method, apparatuses, and non-transitory computer-readable medium described herein may further include operations, features, means, or instructions for downlinking control information of the downlink control channel carries the group feedback message. In some examples of the method, apparatuses, and non-transitory computer-readable medium described herein, a size of the downlink control information (DCI) corresponds to one of a fallback size, a preconfigured format size, a control configurable size, or a variable size based on the group feedback message.

Some examples of the method, apparatuses, and non-transitory computer-readable medium described herein may further include operations, features, means, or instructions for scrambling the DCI using a mask common to the set of UEs or associated with a cell ID. In some examples of the method, apparatuses, and non-transitory computer-readable medium described herein, transmitting the group feedback message may include operations, features, means, or instructions for transmitting a downlink shared channel that includes the group feedback message.

Some examples of the method, apparatuses, and non-transitory computer-readable medium described herein may further include operations, features, means, or instructions for identifying a set of transmission resources for the downlink shared channel and transmitting a control message to the set of UEs, the control message indicating the set of transmission resources for the downlink shared channel. Some examples of the method, apparatuses, and non-transitory computer-readable medium described herein may further include operations, features, means, or instructions for transmitting DCI that schedules transmission of the group feedback message via the downlink shared channel.

Some examples of the method, apparatuses, and non-transitory computer-readable medium described herein may further include operations, features, means, or instructions for scrambling the DCI using a mask common to the set of UEs or associated with a cell ID. In some examples of the method, apparatuses, and non-transitory computer-readable medium described herein, the DCI schedules transmission of a data transmission via the downlink shared channel.

Some examples of the method, apparatuses, and non-transitory computer-readable medium described herein may further include operations, features, means, or instructions for including an indicator bit in the DCI for indicating the group feedback message or a data transmission. Some examples of the method, apparatuses, and non-transitory computer-readable medium described herein may further include operations, features, means, or instructions for including an indicator bit in the DCI for indicating the group feedback message may be carried in the DCI or the downlink shared channel.

Some examples of the method, apparatuses, and non-transitory computer-readable medium described herein, the transmission parameters used for transmitting the DCI indicates the group feedback message or a data transmission. In some examples of the method, apparatuses, and non-transitory computer-readable medium described herein, the transmission parameters include a zero-allocation indication or an MCS index.

Some examples of the method, apparatuses, and non-transitory computer-readable medium described herein may further include operations, the transmission parameters used for transmitting the DCI indicates whether the group feedback information may be carried in the DCI or the downlink shared channel.

Some examples of the method, apparatuses, and non-transitory computer-readable medium described herein may further include operations, features, means, or instructions for monitoring for multiple uplink transmissions from a first UE of the set of UEs and transmitting the group feedback message to the first UE, where the group feedback message includes a bitmap that indicates feedback for each of the multiple uplink transmissions from the first UE. In some examples of the method, apparatuses, and non-transitory computer-readable medium described herein, each location of the bitmap corresponds to feedback for a respective uplink transmission of the multiple uplink transmissions.

Some examples of the method, apparatuses, and non-transitory computer-readable medium described herein may further include operations, features, means, or instructions for determining each location based on an index of the respective uplink transmission, where the index may be based on a resource allocation of the respective uplink transmission, a multi-input multi-output layer index of the respective uplink transmission, a non-orthogonal multiple access parameter of the respective uplink transmission, a spreading code index of the respective uplink transmission.

In some examples of the method, apparatuses, and non-transitory computer-readable medium described herein, generating the group feedback message may include operations, features, means, or instructions for generating a bloom filter that indicates feedback information for each UE of the set of UEs, where the bloom filter includes a vector of a set of hashes for the set of UEs. Some examples of the method, apparatuses, and non-transitory computer-readable medium described herein may further include operations, features, means, or instructions for generating each hash of the set of hashes for a respective UE of the set of UEs and transmitting a respective hash indication to each UE of the set of UEs.

In some examples of the method, apparatuses, and non-transitory computer-readable medium described herein, generating the group feedback message may include operations, features, means, or instructions for generating a second bloom filter that indicates NACK information for each UE of the set of UEs. In some examples of the method, apparatuses, and non-transitory computer-readable medium described herein, transmitting the group feedback message may include operations, features, means, or instructions for transmitting the group feedback message according to a hopping scheme, where the hopping scheme may be a time hopping scheme or a frequency hopping scheme.

Some examples of the method, apparatuses, and non-transitory computer-readable medium described herein may further include operations, features, means, or instructions for transmitting a control message indicating a hopping sequence associated with the hopping scheme.

A method of wireless communications at a UE is described. The method may include identifying a set of time-frequency resources for uplink transmissions, transmitting one or more uplink transmissions to a base station via the set of time-frequency resources, and monitoring for a group feedback message from the base station in response to the one or more uplink transmissions, where the group feedback message includes an indication of whether an uplink transmission was received from a set of UEs including the UE.

An apparatus for wireless communications at a UE is described. The apparatus may include a processor, memory in electronic communication with the processor, and instructions stored in the memory. The instructions may be executable by the processor to cause the apparatus to identify a set of time-frequency resources for uplink transmissions, transmit one or more uplink transmissions to a base station via the set of time-frequency resources, and monitor for a group feedback message from the base station in response to the one or more uplink transmissions, where the group feedback message includes an indication of whether an uplink transmission was received from a set of UEs including the UE.

Another apparatus for wireless communications at a UE is described. The apparatus may include means for identifying a set of time-frequency resources for uplink transmissions, transmitting one or more uplink transmissions to a base station via the set of time-frequency resources, and monitoring for a group feedback message from the base station in response to the one or more uplink transmissions, where the group feedback message includes an indication of whether an uplink transmission was received from a set of UEs including the UE.

A non-transitory computer-readable medium storing code for wireless communications at a UE is described. The code may include instructions executable by a processor to identify a set of time-frequency resources for uplink transmissions, transmit one or more uplink transmissions to a base station via the set of time-frequency resources, and monitor for a group feedback message from the base station in response to the one or more uplink transmissions, where the group feedback message includes an indication of whether an uplink transmission was received from a set of UEs including the UE.

In some examples of the method, apparatuses, and non-transitory computer-readable medium described herein, the one or more uplink transmissions include one or more grant-free uplink transmissions.

In some examples of the method, apparatuses, and non-transitory computer-readable medium described herein, monitoring for the group feedback message may include operations, features, means, or instructions for receiving the group feedback message, the group feedback message including a bitmap that indicates feedback information for each UE of the set of UEs, where each location of the bitmap corresponds to a respective UE of the set of UEs or multiple UEs of the set of UEs.

Some examples of the method, apparatuses, and non-transitory computer-readable medium described herein may further include operations, features, means, or instructions for receiving a control message from the base station, the control message indicating that a first location of the bitmap may be configured for the UE. Some examples of the method, apparatuses, and non-transitory computer-readable medium described herein may further include operations, features, means, or instructions for identifying a UE ID for the UE and determining a location of the bitmap configured for the UE based on the UE ID.

In some examples of the method, apparatuses, and non-transitory computer-readable medium described herein, the UE ID includes a C-RNTI or a CS-RNTI. Some examples of the method, apparatuses, and non-transitory computer-readable medium described herein may further include operations, features, means, or instructions for calculating a hash function or a modulo function based on the UE ID, where the location may be determined based on the hash function or the modulo function.

Some examples of the method, apparatuses, and non-transitory computer-readable medium described herein may further include operations, features, means, or instructions for transmitting the one or more uplink transmissions via an uplink shared channel and determining the location within the bitmap based on a frequency allocation for the uplink shared channel, a time allocation for the uplink shared channel, a BWP associated with the uplink shared channel, a transmission signature of the uplink shared channel, the UE ID, or any combination thereof.

Some examples of the method, apparatuses, and non-transitory computer-readable medium described herein may further include operations, features, means, or instructions for receiving a NACK indication from the base station in the bitmap. Some examples of the method, apparatuses, and non-transitory computer-readable medium described herein may further include operations, features, means, or instructions for transmitting a retransmission of the one or more grant free uplink transmissions to the base station over the set of time-frequency resources in response to the NACK indication.

Some examples of the method, apparatuses, and non-transitory computer-readable medium described herein may further include operations, features, means, or instructions for receiving an uplink grant from the base station, the uplink grant conveying a grant for retransmission and transmitting the retransmission of the one or more grant free uplink transmissions to the base station in response to the uplink grant.

Some examples of the method, apparatuses, and non-transitory computer-readable medium described herein may further include operations, features, means, or instructions for transmitting a retransmission of the one or more grant free uplink transmissions to the base station over a second set of time-frequency resources different from the set of time-frequency resources in response to the NACK indication. In some examples of the method, apparatuses, and non-transitory computer-readable medium described herein, the second set of time-frequency resources may be based on a location of the NACK indication within the bitmap.

Some examples of the method, apparatuses, and non-transitory computer-readable medium described herein may further include operations, features, means, or instructions for receiving a control message from the base station that indicates the second set of time-frequency resources. Some examples of the method, apparatuses, and non-transitory computer-readable medium described herein may further include operations, features, means, or instructions for transmitting a retransmission of the one or more grant free uplink transmissions to the base station in response to the NACK indication, where the retransmission may be based on a BWP associated with the uplink shared channel transmission.

In some examples of the method, apparatuses, and non-transitory computer-readable medium described herein, monitoring for the group feedback message may include operations, features, means, or instructions for receiving an ACK bitmap that indicates ACK feedback information for the set of UEs and receiving a NACK bitmap that indicates NACK feedback information for the set of UEs. In some examples of the method, apparatuses, and non-transitory computer-readable medium described herein, monitoring for the group feedback message may include operations, features, means, or instructions for receiving a detection bitmap that indicates whether detecting of the one or more uplink transmissions from the UE was successful.

In some examples of the method, apparatuses, and non-transitory computer-readable medium described herein, monitoring for the group feedback message may include operations, features, means, or instructions for receiving a first bitmap that indicates feedback information for each UE of the set of UEs, where each location of the first bitmap corresponds to a respective UE of the set of UEs and receiving a second bitmap that indicates feedback information for each UE of the set of UEs, where each location of the second bitmap corresponds to a respective transmission from the set of UEs.

In some examples of the method, apparatuses, and non-transitory computer-readable medium described herein, monitoring for the group feedback message may include operations, features, means, or instructions for receiving a downlink control channel that includes the group feedback message. In some examples of the method, apparatuses, and non-transitory computer-readable medium described herein, the downlink control channel may be transmitted according to a set of transmission parameters different from other downlink control channels.

In some examples of the method, apparatuses, and non-transitory computer-readable medium described herein, the set of transmission parameters includes a control resource set, a search space, a monitoring occasion, a set of configured control resources, or any combination thereof. Some examples of the method, apparatuses, and non-transitory computer-readable medium described herein may further include operations, features, means, or instructions for receiving a control message from the base station, where the control message indicates a UE configuration for an absence of the group feedback message.

Some examples of the method, apparatuses, and non-transitory computer-readable medium described herein may further include operations, features, means, or instructions for receiving the downlink control channel according to an aggregation level configuration, where the aggregation level configuration may be indicated via a control message, a maximum of a set of preconfigured aggregation levels, a default aggregation level, or any combination thereof.

Some examples of the method, apparatuses, and non-transitory computer-readable medium described herein may further include operations, features, means, or instructions for downlinking control information of the downlink control channel carries the group feedback message. In some examples of the method, apparatuses, and non-transitory computer-readable medium described herein, a size of the DCI corresponds to one of a fallback size, a preconfigured format size, a control configurable size, or a variable size based on the group feedback message.

In some examples of the method, apparatuses, and non-transitory computer-readable medium described herein, the DCI may be scrambled using a mask common to the set of UEs or associated with a cell ID. In some examples of the method, apparatuses, and non-transitory computer-readable medium described herein, monitoring for the group feedback message may include operations, features, means, or instructions for receiving a downlink shared channel that includes the group feedback message.

Some examples of the method, apparatuses, and non-transitory computer-readable medium described herein may further include operations, features, means, or instructions for receiving a control message from the base station, the control message indicating a set of resources for the downlink shared channel. Some examples of the method, apparatuses, and non-transitory computer-readable medium described herein may further include operations, features, means, or instructions for receiving DCI that schedules transmission of the group feedback message via the downlink shared channel.

In some examples of the method, apparatuses, and non-transitory computer-readable medium described herein, the DCI may be scrambled using a mask common to the set of UEs or associated with a cell ID. In some examples of the method, apparatuses, and non-transitory computer-readable medium described herein, the DCI schedules transmission of a data transmission via the downlink shared channel.

Some examples of the method, apparatuses, and non-transitory computer-readable medium described herein may further include operations, features, means, or instructions for identifying an indicator bit in the DCI that indicates whether the DCI may be for the group feedback message or a data transmission. Some examples of the method, apparatuses, and non-transitory computer-readable medium described herein may further include operations, features, means, or instructions for identifying an indicator bit in the DCI that indicates whether the group feedback message may be carried in the DCI or the downlink shared channel.

Some examples of the method, apparatuses, and non-transitory computer-readable medium described herein, the transmission parameters used for transmitting the DCI indicates the group feedback message or a data transmission. In some examples of the method, apparatuses, and non-transitory computer-readable medium described herein, the transmission parameters include a zero-allocation indication or an modulation coding scheme index.

Some examples of the method, apparatuses, and non-transitory computer-readable medium described herein, the transmission parameters used for transmitting the DCI indicates whether the group feedback message may be carried in the DCI or the downlink shared channel. In some examples of the method, apparatuses, and non-transitory computer-readable medium described herein, monitoring for the group feedback message may include operations, features, means, or instructions for receiving the group feedback message from the base station, where the group feedback message includes a bitmap that indicates feedback for each of multiple uplink transmissions from the UE.

In some examples of the method, apparatuses, and non-transitory computer-readable medium described herein, each location of the bitmap corresponds to feedback for a respective uplink transmission of the multiple uplink transmissions. Some examples of the method, apparatuses, and non-transitory computer-readable medium described herein may further include operations, features, means, or instructions for determining each location based on an index of the respective uplink transmission, where the index may be based on a resource allocation of the respective uplink transmission, a multi-input multi-output layer index of the respective uplink transmission, a non-orthogonal multiple access parameter of the respective uplink transmission, a spreading code index of the respective uplink transmission.

In some examples of the method, apparatuses, and non-transitory computer-readable medium described herein, monitoring for the group feedback message may include operations, features, means, or instructions for receiving the group feedback message including a bloom filter that indicates feedback information for each UE of the set of UEs, where the bloom filter includes a vector of a set of hashes for the set of UEs and identifying feedback information for the UE based on a hash of the vector that corresponds to the UE.

Some examples of the method, apparatuses, and non-transitory computer-readable medium described herein may further include operations, features, means, or instructions for receiving a hash indication from the base station, the hash indication indicating the hash of the vector that corresponds to the UE. In some examples of the method, apparatuses, and non-transitory computer-readable medium described herein, monitoring for the group feedback message may include operations, features, means, or instructions for receiving a second bloom filter that indicates NACK information for each UE of the set of UEs.

In some examples of the method, apparatuses, and non-transitory computer-readable medium described herein, monitoring for the group feedback message may include operations, features, means, or instructions for receiving the group feedback message according to a hopping scheme, where the hopping scheme may be a time hopping scheme or a frequency hopping scheme. Some examples of the method, apparatuses, and non-transitory computer-readable medium described herein may further include operations, features, means, or instructions for receiving a control message indicating a hopping sequence associated with the hopping scheme.

DETAILED DESCRIPTION

Figure 1:
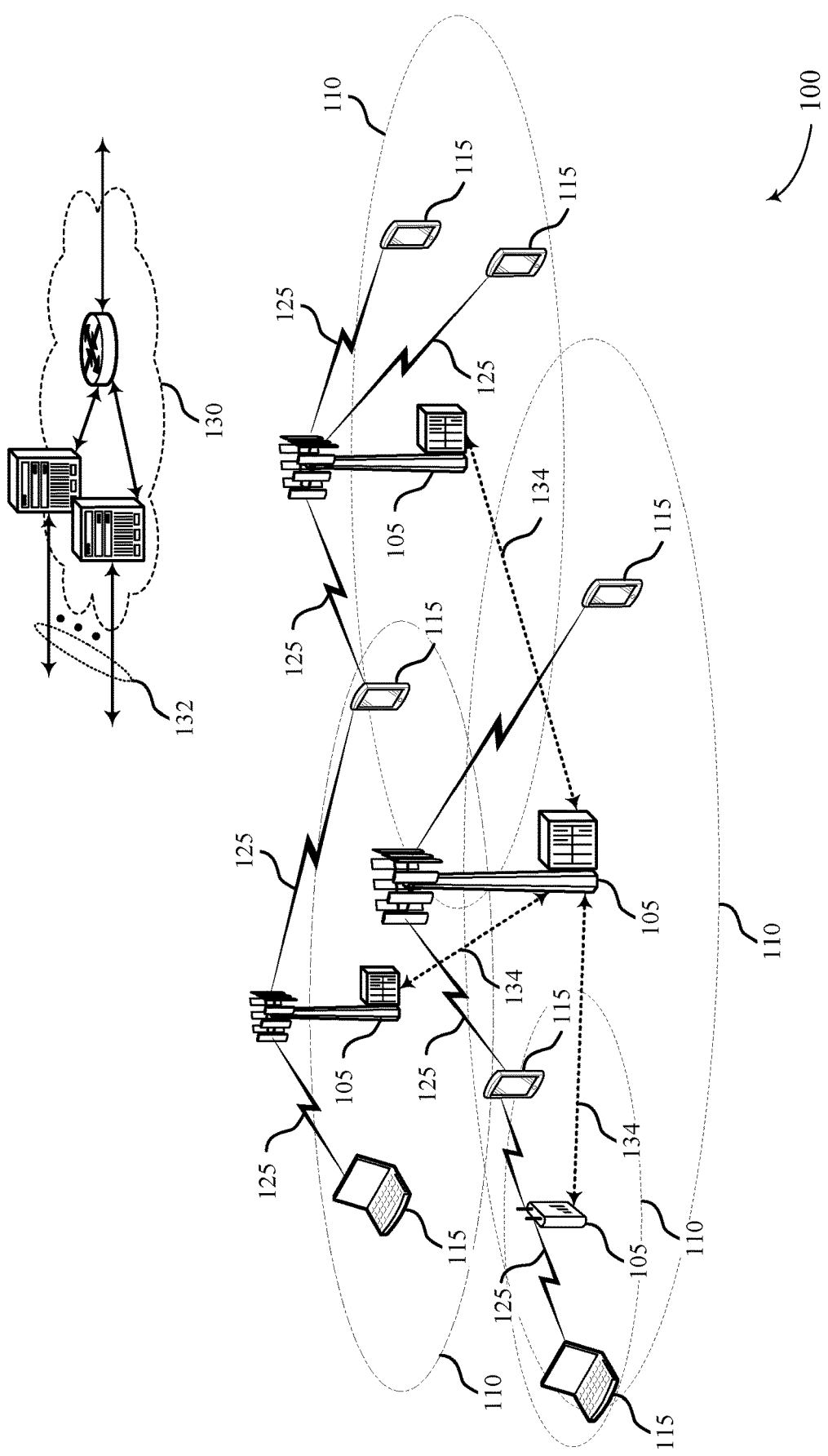
FIGS. 1 through 3 illustrate example wireless communications systems that support group feedback techniques in wireless systems in accordance with aspects of the present disclosure.

Some wireless communications systems may implement grant-free uplink transmissions. These uplink transmissions may be configured via Radio Resource Control (RRC) messaging. In some cases, downlink control information (DCI) messaging may be used to activate or deactivate the grant-free uplink transmissions. A user equipment (UE) may be configured to transmit a grant-free uplink transmission a number of times, which may improve detectability of the uplink transmission.

These wireless communications systems may not provide dedicated resources for feedback associated with grant-free uplink transmissions. Instead, a base station may transmit a grant for retransmission based on whether a grant-free uplink transmission is detected by the base station. For example, a base station may detect a grant-free uplink transmission but may not successfully decode the grant-free uplink transmission. In this example, the base station may transmit an uplink grant scheduling a retransmission of the grant-free uplink transmission.

In other cases, a base station may not transmit any indication that the base station receives a grant-free uplink transmission. For example, a base station may successfully detect and decode the grant-free uplink transmission. In another example, a base station may not detect or decode the grant-free uplink transmission (e.g., due to poor channel conditions or packet collision). In both of these examples, the base station may not transmit any feedback to the transmitting UE corresponding to the grant-free uplink transmission.

A UE may therefore have no knowledge of whether a base station received a grant-free uplink transmission. Thus, in cases where the base station fails to successfully detect an uplink transmission, the transmitting UE may be unable to determine whether to retransmit the uplink transmission. In other cases, a base station may successfully decode a repetitive uplink transmission at an early transmission occasion. As the base station may not transmit any indication of the successful decode, however, the UE may continue to transmit the repetitive uplink transmission during the remaining transmission occasions as originally scheduled. These issues may result in an increase in latency or a decrease in reliability within a wireless communications system.

Generally, aspects of the described techniques provide for a mechanism through which a base station may generate a group feedback message corresponding to uplink transmissions. The group feedback message may be generated based on monitoring resources for transmitted uplink transmissions and may provide feedback for uplink transmissions from multiple UEs, multiple uplink transmissions, or both. Based on the group feedback message, a UE may determine that an uplink transmission was successfully received by a base station, or the base station failed to successfully decode the uplink transmission. In some cases, the uplink transmissions may include grant-free uplink transmissions. Additionally or alternatively, the uplink transmissions may include scheduled (e.g., grant-based) uplink transmissions. The group feedback message may be transmitted over a downlink shared channel or a downlink control channel, and thus a specific channel dedicated to feedback transmission (e.g., a Physical Hybrid Automatic Repeat Request Indicator Channel (PHICH)) may be unnecessary.

Particular aspects of the subject matter described herein may be implemented to realize one or more advantages. The described techniques may support improvements in grant free communications, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to group feedback techniques in wireless systems.

FIG. 1 illustrates an example of a wireless communications system 100 that supports group feedback techniques in wireless systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier (ID) for distinguishing neighboring cells (e.g., a physical cell ID (PCID), a virtual cell ID (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication links 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30$, 720,000 seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication links 125. For example, a carrier of a communication links 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit an uplink transmission to a base station 105. In some cases, the uplink transmission may include a grant-free uplink transmission. Base station 105 may monitor resources for the uplink transmission. Base station 105 may generate a group feedback message corresponding to whether base station 105 successfully received the uplink transmission. The group feedback message may contain feedback for multiple uplink transmissions from one or multiple UEs 115. The group feedback message may be transmitted to UE 115 over a downlink shared channel or a downlink control channel. UE 115 may receive the group feedback message and may determine whether to retransmit the uplink transmission based on the group feedback message.

Figure 2:
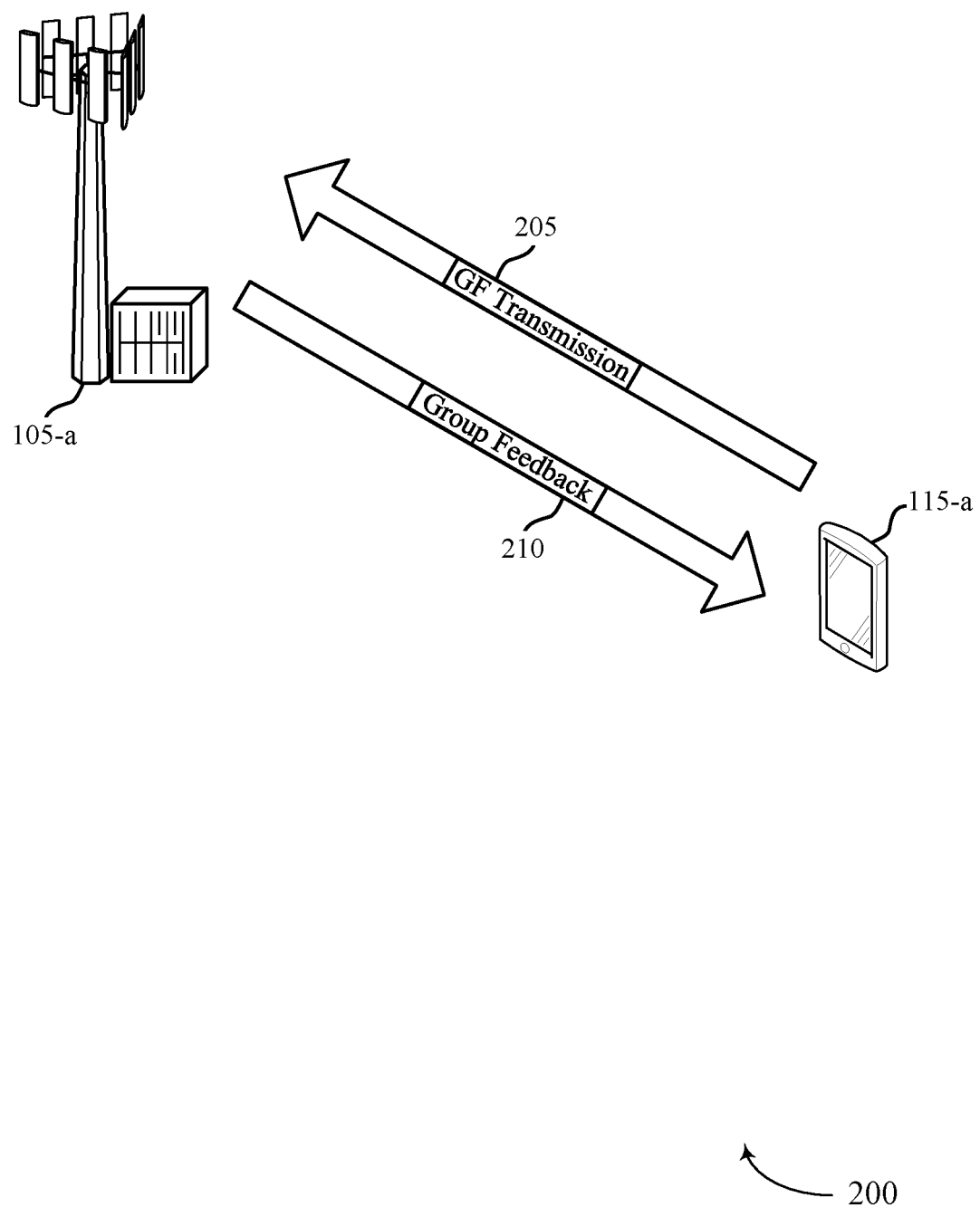

FIG. 2 illustrates an example of a wireless communications system 200 that supports group feedback techniques in wireless systems in accordance with aspects of the present disclosure. In some examples, wireless communications system 200 may implement aspects of wireless communications system 100. Wireless communications system 200 may include a base station 105-a and a UE 115-a, which may be examples of base station 105 and UE 115 as described with reference to FIG. 1. Further, UE 115-a may transmit a grant-free uplink transmission 205 to base station 105-a, and base station 105-a may transmit a group feedback message 210 to UE 115-a. While the example of FIG. 2 is described with reference to grant-free uplink transmission 205, UE 115-a may, additionally or alternatively, transmit a grant-based uplink transmission.

UE 115-a may transmit grant-free uplink transmission 205 to base station 105-a. For example, UE 115-a may have data pending for base station 105-a. Instead of waiting for an uplink grant to schedule a transmission carrying the pending data, UE 115-a may transmit the data in grant-free uplink transmission 205 using a set of grant-free resources. As there is no corresponding uplink grant transmitted for grant-free uplink transmission 205, grant-free communications may free up system resources in wireless communications system 200.

Base station 105-a may monitor resources for grant-free uplink transmission 205. In some cases, base station 105-a may successfully detect (e.g., via a receiving power threshold) and decode grant-free uplink transmission 205. Alternatively, base station 105-a may successfully detect but may not decode grant-free uplink transmission 205. Alternatively, base station 105-a may fail in detecting and decoding grant-free uplink transmission 205.

In either of these cases, base station 105-a may generate group feedback message 210 based on monitoring the resources for grant-free uplink transmission 205. Group feedback message 210 may provide information related to whether base station 105-a successfully received (e.g., detected and decoded) grant-free uplink transmission 205. In the case where base station 105-a did not successfully receive grant-free uplink transmission 205, group feedback message 210 may indicate a negative-acknowledgment (NACK) corresponding to grant-free uplink transmission 205. In the case where base station 105-a successfully received grant-free uplink transmission 205, group feedback message 210 may indicate an acknowledgment (ACK) corresponding to grant-free uplink transmission 205.

Group feedback message 210 may include a bitmap corresponding to different grant-free uplink transmissions (including grant-free uplink transmission 205 for example). In some cases, the bitmap may distinguish information on a UE basis. For example, each location within the bitmap may correspond to feedback for a different UE (e.g., UE 115-a). In these cases, the location of feedback for grant-free uplink transmission 205 may be indicated by a higher layer message (e.g., an RRC configuration message) provided to UE 115-a. Additionally or alternatively, the location of feedback for grant-free uplink transmission 205 may be determined by base station 105-a based on an ID of UE 115-a. For example, base station 105-a may determine a location of feedback for grant-free uplink transmission 205 based on a Cell Radio Network Temporary ID (C-RNTI) or a Configured Scheduling Radio Network Temporary ID (CS-RNTI) associated with UE 115-a. Additionally or alternatively, base station 105-a may determine a location of feedback for grant-free uplink transmission 205 by utilizing a hash or modulo function.

In other cases, the bitmap may differentiate on an uplink transmission basis. For example, each location within the bitmap may correspond to feedback for a different grant-free uplink transmission 205. In these cases, base station 105-a may determine a location of feedback for grant-free uplink transmission 205 based on different characteristics of grant-free uplink transmission 205. For example, the location for feedback may be based on: frequency or time allocation for an uplink shared channel carrying grant-free uplink transmission 205, a bandwidth part (BWP) for an uplink shared channel carrying grant-free uplink transmission 205, a transmission signature for grant-free uplink transmission 205, a UE ID (e.g., an ID of UE 115-a), or a combination thereof.

Code block group (CBG) fields in a DCI message may be used to provide group feedback message 210. In some examples, UE 115-a may transmit multiple transport blocks. In these cases, group feedback message 210 may provide feedback on a transport block basis. Base station 105-a may configure a DCI message to include CBG fields, where each CBG field may indicate an ACK or a NACK for a corresponding transport block. Mapping a transport block to a CBG bit location may be based on assigning an index value to the transport block based on: a frequency-time allocation for the transport block, a MIMO layer index, a non-orthogonal multiple access (NOMA) layer index, a spreading code index, a NOMA parameter, or a combination thereof.

Bloom filter variants may be used as group feedback message 210 instead of a bitmap. For example, a hash may be generated for each ACK based on UE 115-a transmissions or parameters. The hashes may be combined into a vector, which may be encoded and transmitted to UE 115-a. Accordingly, UE 115-a may verify that bits corresponding to a hash are in compliance with the vector. If verified, the corresponding feedback may be determined to be an ACK. If unverified, the corresponding feedback may be determined to be a NACK.

Group feedback message 210 may be transmitted over a downlink control channel (e.g., physical downlink control channel (PDCCH)). For example, group feedback message 210 may be transmitted as a downlink control channel message. Group feedback message 210 may be transmitted in a control resource set (CORESET) separate from other downlink control channel transmissions. Additionally or alternatively, group feedback message 210 may be transmitted in a search space separate from other downlink control channel search spaces. Additionally or alternatively, group feedback message 210 may be transmitted in a monitoring occasion separate from other downlink control channel monitoring occasions. Additionally or alternatively, group feedback message 210 may be transmitted over already configured downlink control channel resources. Additionally or alternatively, group feedback message 210 may be transmitted according to a frequency or time hopping pattern, which may be RRC configured or calculated.

A size of DCI carrying group feedback message 210 over a downlink control channel may vary. In some cases, the size of DCI carrying group feedback message 210 may be a fallback DCI size for common search space (CSS) transmissions. In other cases, the size of DCI carrying group feedback message 210 may be a size corresponding to a DCI format (e.g., DCI format 2A, 2B, etc.). In yet other cases, the size of DCI carrying group feedback message 210 may be unique to the DCI carrying group feedback message 210. In any case, base station 105-a may calculate or configure the DCI size via the RRC layer. Further, different group feedback messages may implement different DCI sizes.

A CRC of DCI carrying group feedback message 210 over a downlink control channel may be scrambled. In some cases, the CRC may be scrambled with a configured mask common to a group of UEs. In another example, the CRC may be scrambled with a mask based on a cell ID of UE 115-a. In yet another example, the CRC may not be scrambled.

UE 115-a may monitor the downlink control channel for group feedback message 210. The locations which UE 115-a monitors may be determined based on an RRC message indicating the locations. Additionally or alternatively, the locations which UE 115-a monitors may be based on an ID of UE 115-a or on transmission parameters. Further, UE 115-a may monitor for group feedback messages relevant to UE 115-a, and may not monitor for all group feedback messages transmitted by base station 105-a.

In some cases, UE 115-a may fail to successfully decode or detect group feedback message 210 over a downlink control channel. In these cases, UE 115-a may determine group feedback message 210 indicated a NACK for grant-free uplink transmission 205. In some cases, UE 115-a may determine a NACK indication further based on RRC signaling from base station 105-a. Additionally or alternatively, a downlink data channel may indicate the presence of group feedback message 210, and UE 115-a may determine the indicated NACK based on the indicated presence of group feedback message 210.

An aggregation level for the downlink control channel carrying group feedback message 210 may be configured or fixed. In some examples, the aggregation level for the downlink control channel may be configured via RRC signaling. In other examples, the aggregation level for the downlink control channel may be selected from a set of configured aggregation levels (e.g., the maximum of the configured aggregation level values). In yet other examples, the aggregation level for the downlink control channel may be a fixed value in wireless communications system 200.

Group feedback message 210 may be transmitted over a downlink shared channel (e.g., PDSCH). Transmission resources of a downlink shared channel may be configured to carry group feedback message 210 via RRC signaling. Alternatively, a DCI message may be transmitted to UE 115-a to schedule group feedback message 210 over a downlink shared channel. A CRC of the DCI may be scrambled with a cell ID or a configurable mask.

In some cases, a DCI message may include both group feedback information and an indication of resource allocation of a downlink shared channel for group feedback message 210. For example, a DCI message may include an indication of an ACK as well as an indication of resources for group feedback message 210, which may include different information that the ACK indicated in the DCI message. In some cases, an indicator bit in DCI may indicate whether to rely on the ACK in the DCI message or the group feedback message 210. In other cases, allocation parameters (e.g., zero-allocation or modulation coding scheme (MCS) index) may be used by UE 115-a to determine whether to rely on the ACK in the DCI message or group feedback message 210.

UE 115-a may determine to retransmit grant-free uplink transmission 205 based on group feedback message 210. If UE 115-a receives an ACK for grant-free uplink transmission 205, UE 115-a may determine that grant-free uplink transmission was successfully received and may refrain from retransmitting grant-free uplink transmission 205. If UE 115-a receives a NACK for grant-free uplink transmission 205, UE 115-a may retransmit grant-free uplink transmission 205. In some cases, UE 115-a may not receive group feedback message 210. In these cases, UE 115-a may treat non-reception of group feedback message 210 as a NACK, and may retransmit grant-free uplink transmission 205 based on not receiving group feedback message 210.

In some cases, UE 115-a may retransmit grant-free uplink transmission 205 while attempting to avoid potential packet collisions. In an example, UE 115-a may refrain from retransmitting grant-free uplink transmission 205 until UE 115-a receives an uplink grant for the retransmission. In another example, retransmitting grant-free uplink transmission 205 may occur on resources different than resources used for the first transmitting of grant-free uplink transmission 205. The different resources may be based on a UE index or an RRC configuration.

Figure 3:
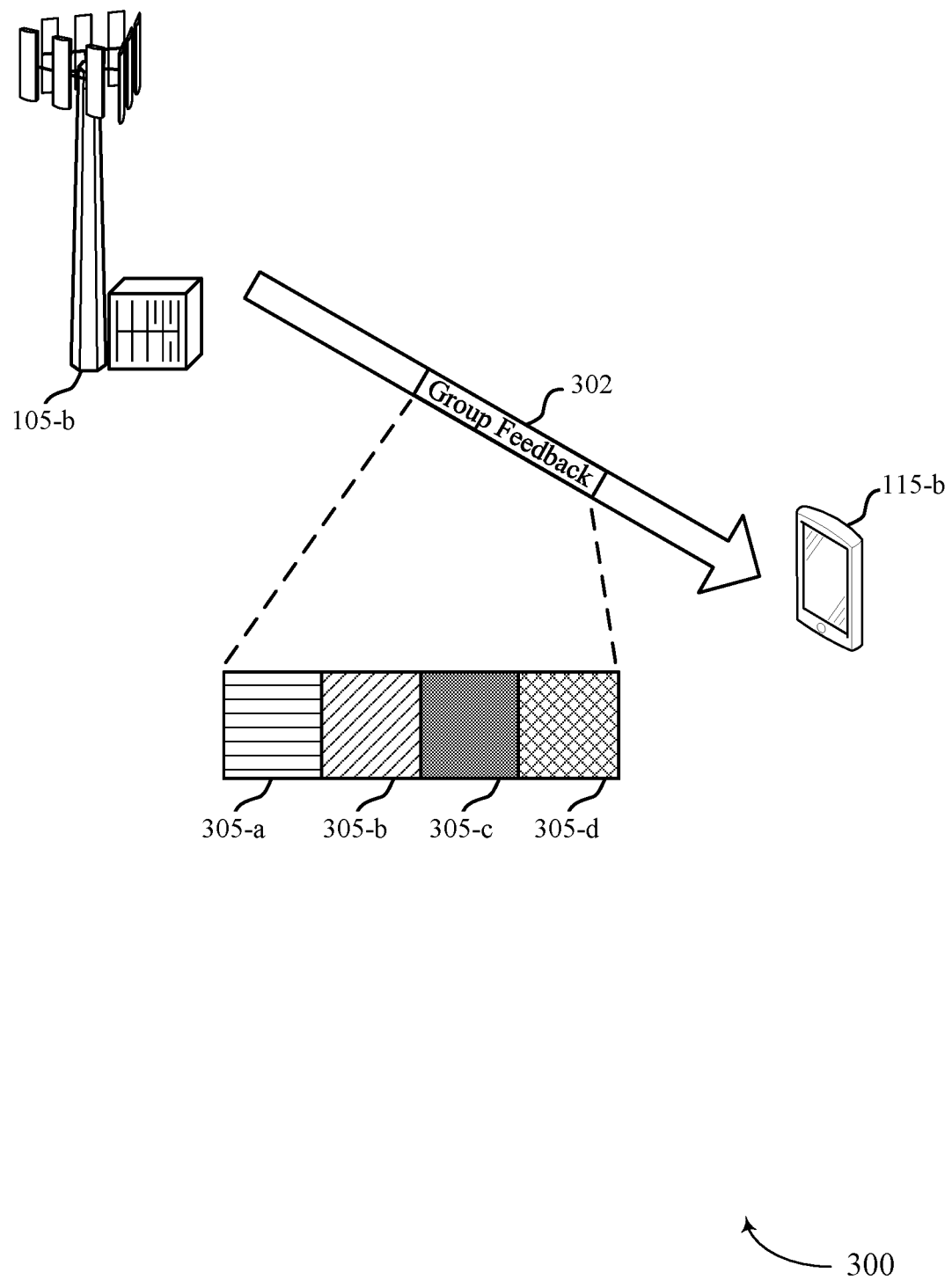

FIG. 3 illustrates an example of a wireless communications system 300 that supports group feedback techniques in wireless systems in accordance with aspects of the present disclosure. In some examples, wireless communications system 300 may implement aspects of wireless communications systems 100 or 200. Base station 105-b may transmit group feedback message 302 to UE 115-b. Group feedback message 302 may include a first feedback location 305-a, a second feedback location 305-b, a third feedback location 305-c, and a fourth feedback location 305-d.

Base station 105-b may monitor for one or more grant-free uplink transmissions. In some cases, base station 105-b may receive one or more grant-free uplink transmissions. Based on reception of the grant-free uplink transmissions, base station 105-b may generate group feedback message 302. Group feedback message 302 may include a bitmap, where each location in the bitmap may correspond to a UE (e.g., UE 115-b) or a grant-free uplink transmission. For example, first feedback location 305-a may correspond to a first UE, such as UE 115-b, whereas second feedback location 305-b may correspond to another UE. As another example, third feedback location 305-c may correspond to a first grant-free uplink transmission, and fourth feedback location 305-*d* may correspond to a second grant-free uplink transmission. In some cases, the first and second grant-free uplink transmission may be transmitted by the same UE (e.g., UE 115-*b*).

As further discussed above with reference to FIG. 2, the location for feedback may be determined according to a variety of factors. If a feedback location is on a UE-basis, then the location of feedback for a grant-free uplink transmission may be indicated by a higher layer message (e.g., a RRC configuration message) provided to UE 115-*b*. Alternatively, the location of feedback for a grant-free uplink transmission may be determined by base station 105-*b* based on an ID of UE 115-*b*. For example, base station 105-*b* may determine a location of feedback for a grant-free uplink transmission based on a C-RNTI or a CS-RNTI associated with UE 115-*b*. Additionally or alternatively, base station 105-*b* may determine a location of group feedback message 302 for a grant-free uplink transmission by utilizing a hash or modulo function.

If a location is on an uplink transmission basis, then the location for group feedback message 302 may be based on: frequency or time allocation for an uplink shared channel carrying a grant-free uplink transmission, a BWP for an uplink shared channel carrying a grant-free uplink transmission, a transmission signature for a grant-free uplink transmission, an ID of UE 115-*b*, or a combination thereof.

Figure 4:
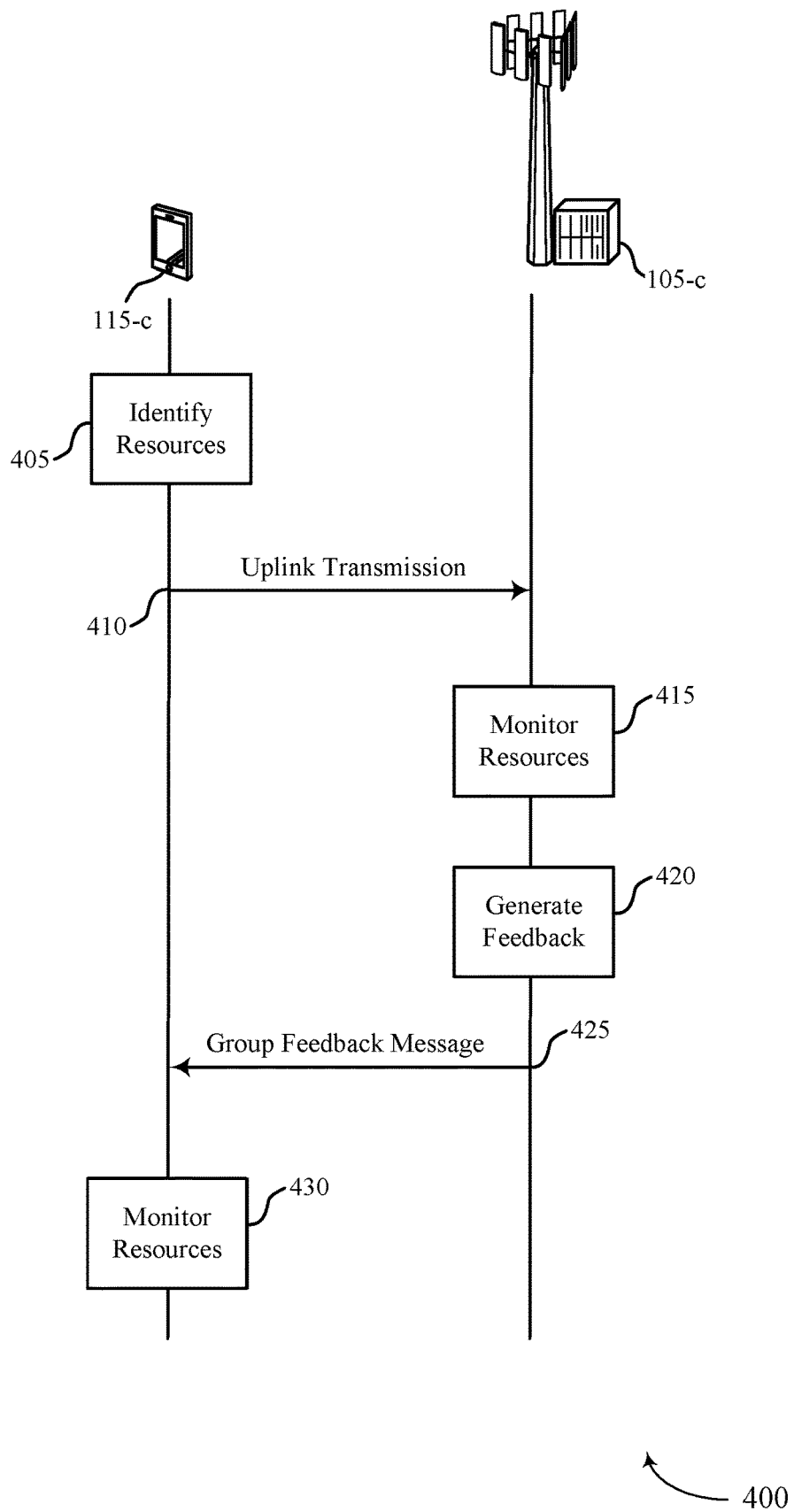
FIG. 4 illustrates an example of a process flow that supports group feedback techniques in wireless systems in accordance with aspects of the present disclosure.

FIG. 4 illustrates an example of a process flow 400 that supports group feedback techniques in wireless systems in accordance with aspects of the present disclosure. In some examples, process flow 400 may implement aspects of wireless communications systems 100, 200, or 300. Process flow 400 may include UE 115-*c* and base station 105-*c*, which may be examples of UE 115 and base station 105 as discussed with further reference to FIGS. 1-3.

At 405, UE 115-*c* may identify a set of time-frequency resources for grant-free uplink transmissions.

At 410, UE 115-*c* may transmit one or more uplink transmissions (e.g., one or more grant-free uplink transmissions) to a base station 105-*c* via the set of time-frequency resources.

At 415, base station 105-*c* may monitor a set of time-frequency resources for one or more grant-free uplink transmissions from a set of UEs including UE 115-*c* in communication with base station 105-*c*.

At 420, base station 105-*c* may generate a group feedback message for the set of UEs including UE 115-*c*. The group feedback message may include an indication of whether an uplink transmission was received from each UE (e.g., UE 115-*c*) of the set of UEs 115 based at least in part on the monitoring.

At 425, base station 105-*c* may transmit the group feedback message to UE 115-*c*. At 430, UE 115-*c* may monitor for the group feedback message from the base station 105-*c* in response to the one or more grant-free uplink transmissions.

Figure 5:
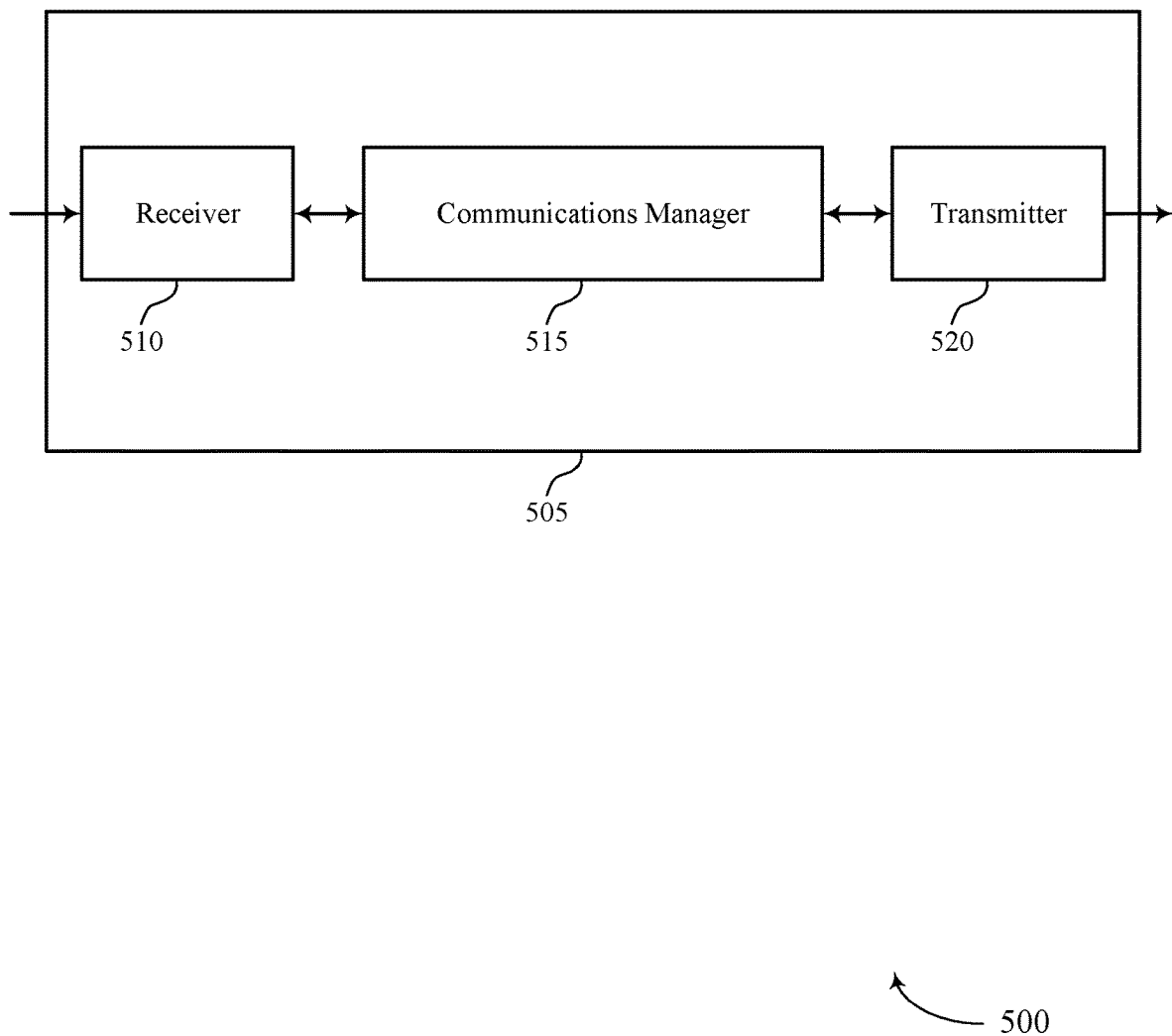
FIGS. 5 and 6 show block diagrams of devices that support group feedback techniques in wireless systems in accordance with aspects of the present disclosure.

FIG. 5 shows a block diagram 500 of a device 505 that supports group feedback techniques in wireless systems in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to group feedback techniques in wireless systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a set of time-frequency resources for uplink transmissions, transmit one or more uplink transmissions to a base station via the set of time-frequency resources, and monitor for a group feedback message from the base station in response to the one or more uplink transmissions, where the group feedback message includes an indication of whether an uplink transmission was received from a set of UEs including the UE. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive feedback for grant-free uplink transmissions from a base station. The feedback may include an indication that a transmission was undetected or successfully decoded. This feedback may increase reliability and reduce latency during retransmissions.

Based on techniques for implementing feedback for grant-free uplink transmissions as described herein, a processor of a UE 115 (e.g., controlling the receiver 510, the transmitter 520, or the transceiver 820 as described with reference to FIG. 8) may increase reliability and decrease signaling overhead in the communication of feedback because the UE 115 may avoid going through unnecessary configuration processes during retransmissions.

Figure 6:
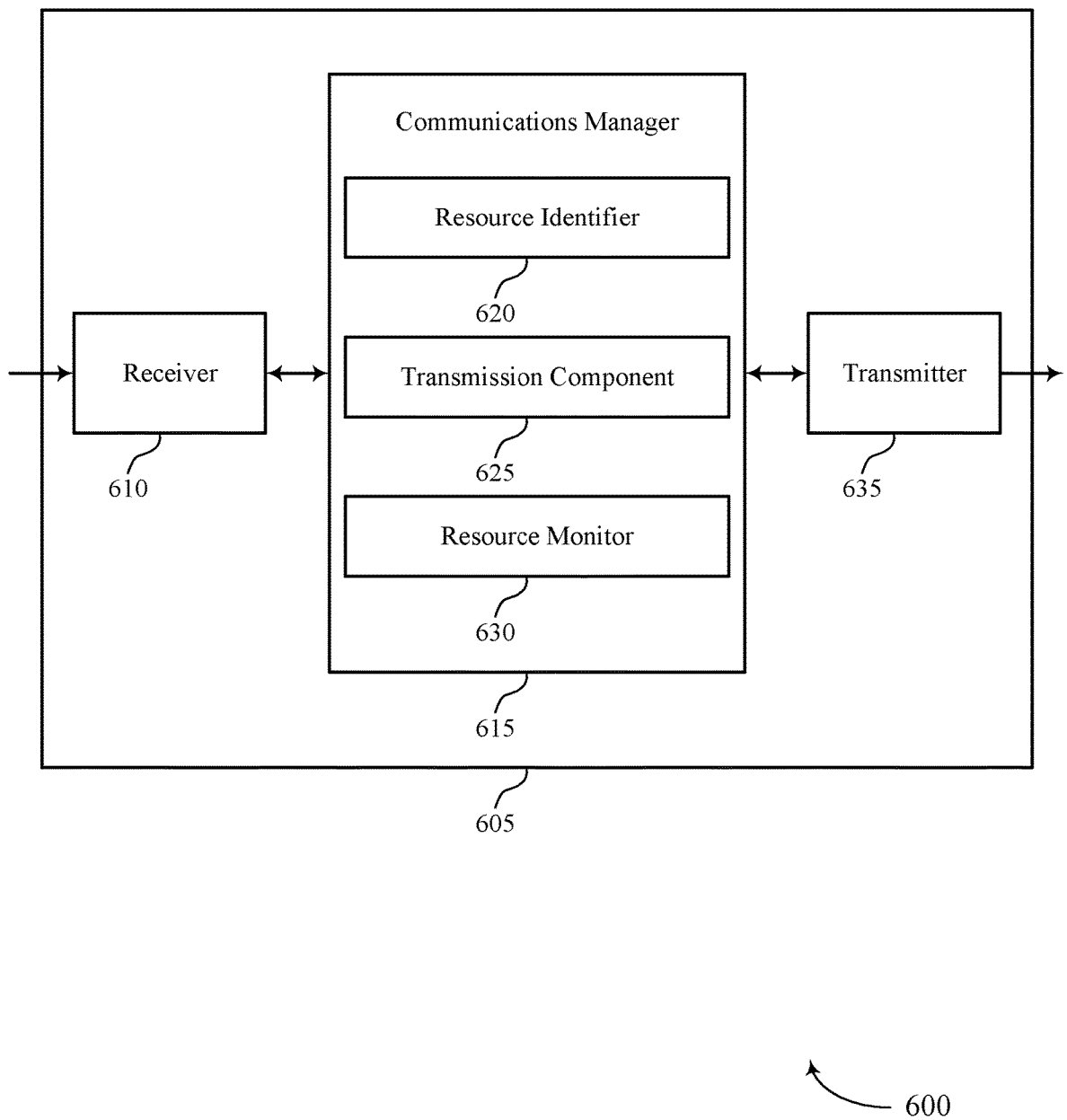

FIG. 6 shows a block diagram 600 of a device 605 that supports group feedback techniques in wireless systems in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to group feedback techniques in wireless systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a resource identifier 620, a transmission component 625, and a resource monitor 630. The communications manager 615 may be an example of aspects of the communications manager 810 described herein.

The resource identifier 620 may identify a set of time-frequency resources for uplink transmissions. The transmission component 625 may transmit one or more uplink transmissions to a base station via the set of time-frequency resources.

The resource monitor 630 may monitor for a group feedback message from the base station in response to the one or more uplink transmissions, where the group feedback message includes an indication of whether an uplink transmission was received from a set of UEs including the UE.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
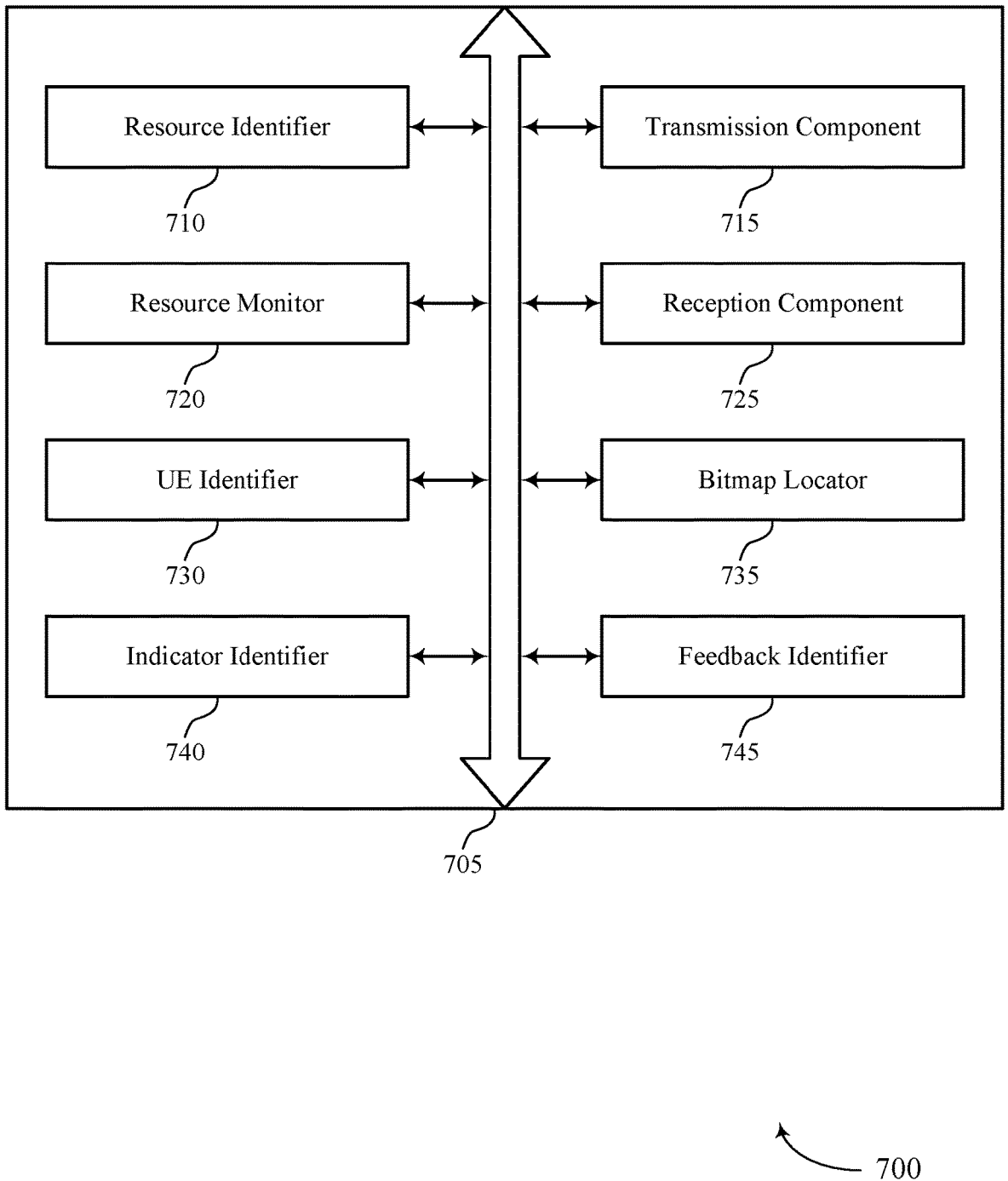
FIG. 7 shows a block diagram of a communications manager that supports group feedback techniques in wireless systems in accordance with aspects of the present disclosure.

FIG. 7 shows a block diagram 700 of a communications manager 705 that supports group feedback techniques in wireless systems in accordance with aspects of the present disclosure. The communications manager 705 may be an example of aspects of a communications manager 515, a communications manager 615, or a communications manager 810 described herein. The communications manager 705 may include a resource identifier 710, a transmission component 715, a resource monitor 720, a reception component 725, a UE identifier 730, a bitmap locator 735, an indicator identifier 740, and a feedback identifier 745. Each of these modules may communicate, directly or indirectly, with one another (e.g., via one or more buses).

The resource identifier 710 may identify a set of time-frequency resources for uplink transmissions. The transmission component 715 may transmit one or more uplink transmissions to a base station via the set of time-frequency resources. In some examples, the transmission component 715 may transmit the one or more uplink transmissions via an uplink shared channel.

In some examples, the transmission component 715 may transmit a retransmission of the one or more grant free uplink transmissions to the base station over the set of time-frequency resources in response to the NACK indication. In some examples, the transmission component 715 may transmit the retransmission of the one or more grant free uplink transmissions to the base station in response to the uplink grant. In some examples, the transmission component 715 may transmit a retransmission of the one or more grant free uplink transmissions to the base station over a second set of time-frequency resources different from the set of time-frequency resources in response to the NACK indication.

In some examples, the transmission component 715 may transmit a retransmission of the one or more grant free uplink transmissions to the base station in response to the NACK indication, where the retransmission is based on a BWP associated with the uplink shared channel transmission. In some cases, the one or more uplink transmissions include one or more grant-free uplink transmissions. In some cases, the second set of time-frequency resources is based on a location of the NACK indication within the bitmap.

The resource monitor 720 may monitor for a group feedback message from the base station in response to the one or more uplink transmissions, where the group feedback message includes an indication of whether an uplink transmission was received from a set of UEs including the UE.

In some examples, the reception component 725 may receive a downlink shared channel that includes the group feedback message. In some examples, the group feedback message may include a bitmap that indicates feedback for each of multiple uplink transmissions from the UE. In some cases, each location of the bitmap corresponds to feedback for a respective uplink transmission of the multiple uplink transmissions.

The reception component 725 may receive the group feedback message, the group feedback message including a bitmap that indicates feedback information for each UE of the set of UEs, where each location of the bitmap corresponds to a respective UE of the set of UEs or multiple UEs of the set of UEs.

In some examples, the reception component 725 may receive a control message from the base station, the control message indicating that a first location of the bitmap is configured for the UE. In some examples, the reception component 725 may receive a NACK indication from the base station in the bitmap. In some examples, the reception component 725 may receive an uplink grant from the base station, the uplink grant conveying a grant for retransmission.

In some examples, the reception component 725 may receive a control message from the base station that indicates the second set of time-frequency resources. In some examples, the reception component 725 may receive an ACK bitmap that indicates ACK feedback information for the set of UEs. In some examples, the reception component 725 may receive a NACK bitmap that indicates NACK feedback information for the set of UEs.

In some examples, the reception component 725 may receive a detection bitmap that indicates whether detecting of the one or more uplink transmissions from the UE was successful. In some examples, the reception component 725 may receive a first bitmap that indicates feedback information for each UE of the set of UEs, where each location of the first bitmap corresponds to a respective UE of the set of UEs.

In some examples, the reception component 725 may receive a second bitmap that indicates feedback information for each UE of the set of UEs, where each location of the second bitmap corresponds to a respective transmission from the set of UEs. In some examples, receiving a downlink control channel that includes the group feedback message. In some examples, the reception component 725 may receive a control message from the base station, where the control message indicates a UE configuration for an absence of the group feedback message.

In some examples, the reception component 725 may receive the downlink control channel according to an aggregation level configuration, where the aggregation level configuration is indicated via a control message, a maximum of a set of preconfigured aggregation levels, a default aggregation level, or any combination thereof. In some examples, DCI of the downlink control channel carries the group feedback message.

In some examples, the reception component 725 may receive a control message from the base station, the control message indicating a set of resources for the downlink shared channel. In some examples, the reception component 725 may receive DCI that schedules transmission of the group feedback message via the downlink shared channel. In some examples, receiving the group feedback message may include a bloom filter that indicates feedback information for each UE of the set of UEs, where the bloom filter includes a vector of a set of hashes for the set of UEs.

In some examples, the reception component 725 may receive a hash indication from the base station, the hash indication indicating the hash of the vector that corresponds to the UE. In some examples, the reception component 725 may receive a second bloom filter that indicates NACK information for each UE of the set of UEs. In some examples, the reception component 725 may receive the group feedback message according to a hopping scheme, where the hopping scheme is a time hopping scheme or a frequency hopping scheme.

In some examples, the reception component 725 may receive a control message indicating a hopping sequence associated with the hopping scheme. In some cases, the downlink control channel is transmitted according to a set of transmission parameters different from other downlink control channels. In some cases, the set of transmission parameters includes a control resource set, a search space, a monitoring occasion, a set of configured control resources, or any combination thereof.

In some cases, a size of the DCI corresponds to one of a fallback size, a preconfigured format size, a control configurable size, or a variable size based on the group feedback message. In some cases, the DCI is scrambled using a mask common to the set of UEs or associated with a cell ID. In some cases, the DCI schedules transmission of a data transmission via the downlink shared channel.

The UE identifier 730 may identify a UE ID for the UE. In some examples, the UE identifier 730 may calculate a hash function or a modulo function based on the UE ID, where the location is determined based on the hash function or the modulo function.

The bitmap locator 735 may determine a location of the bitmap configured for the UE based on the UE ID. In some examples, the bitmap locator 735 may determine the location within the bitmap based on a frequency allocation for the uplink shared channel, a time allocation for the uplink shared channel, a BWP associated with the uplink shared channel, a transmission signature of the uplink shared channel, the UE ID, or any combination thereof.

In some examples, the bitmap locator 735 may determine each location based on an index of the respective uplink transmission, where the index is based on a resource allocation of the respective uplink transmission, a multi-input multi-output layer index of the respective uplink transmission, a non-orthogonal multiple access parameter of the respective uplink transmission, a spreading code index of the respective uplink transmission. In some cases, the UE ID includes a C-RNTI or a CS-RNTI.

The indicator identifier 740 may identify an indicator bit in the DCI that indicates whether the DCI is for the group feedback message or a data transmission. In some examples, the indicator identifier 740 may identify an indicator bit in the DCI that indicates whether the group feedback message is carried in the DCI or the downlink shared channel.

In some examples, the indicator identifier 740 may transmission parameters used for transmitting the DCI indicates the group feedback message or a data transmission. In some examples, the indicator identifier 740 may transmission parameters used for transmitting the DCI indicates whether the group feedback message is carried in the DCI or the downlink shared channel. In some cases, the transmission parameters include a zero-allocation indication or an MCS index.

The feedback identifier 745 may identify feedback information for the UE based on a hash of the vector that corresponds to the UE.

Figure 8:
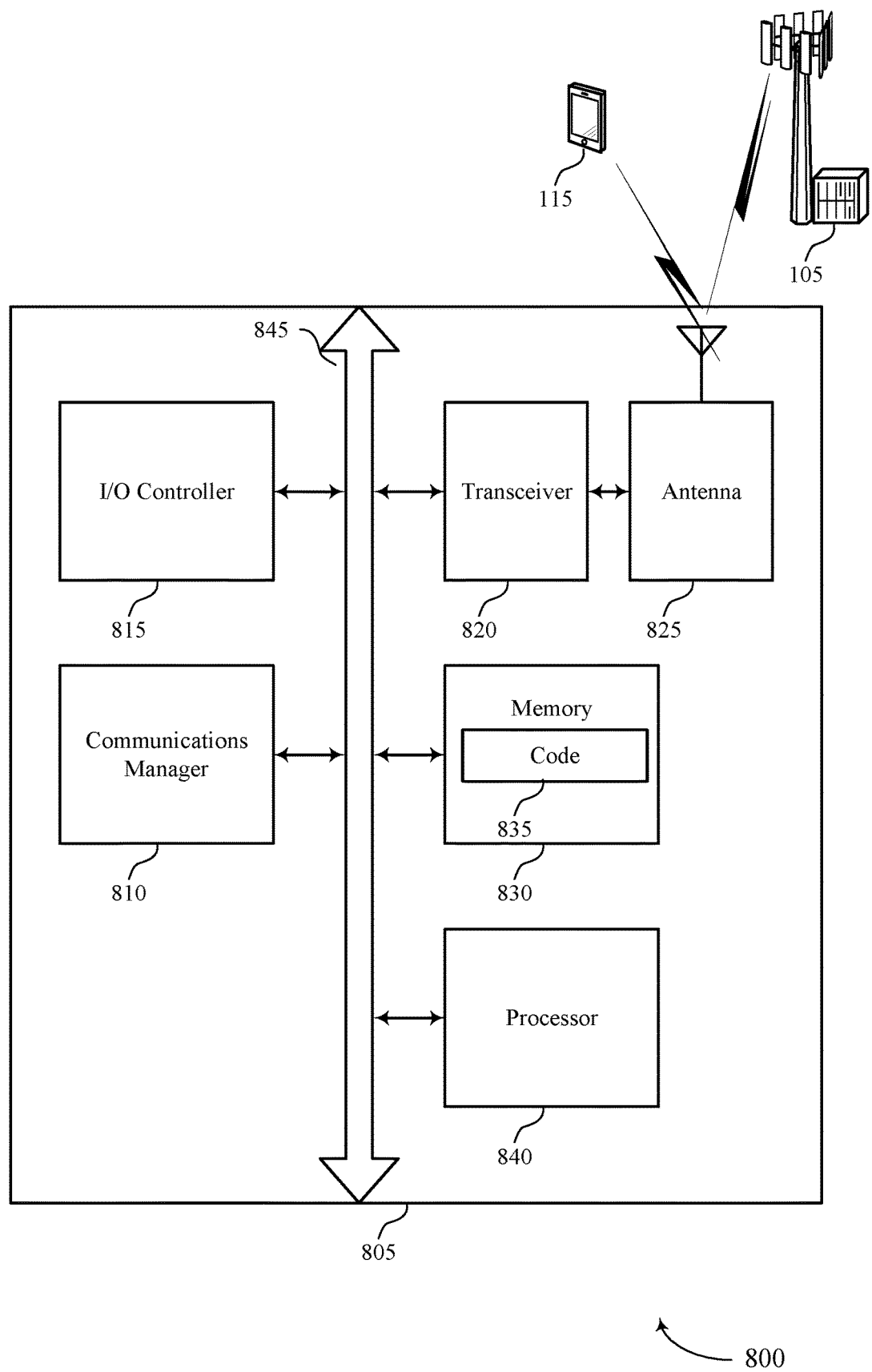
FIG. 8 shows a diagram of a system including a device that supports group feedback techniques in wireless systems in accordance with aspects of the present disclosure.

FIG. 8 shows a diagram of a system 800 including a device 805 that supports group feedback techniques in wireless systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a set of time-frequency resources for uplink transmissions, transmit one or more uplink transmissions to a base station via the set of time-frequency resources, and monitor for a group feedback message from the base station in response to the one or more uplink transmissions, where the group feedback message includes an indication of whether an uplink transmission was received from a set of UEs including the UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting group feedback techniques in wireless systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
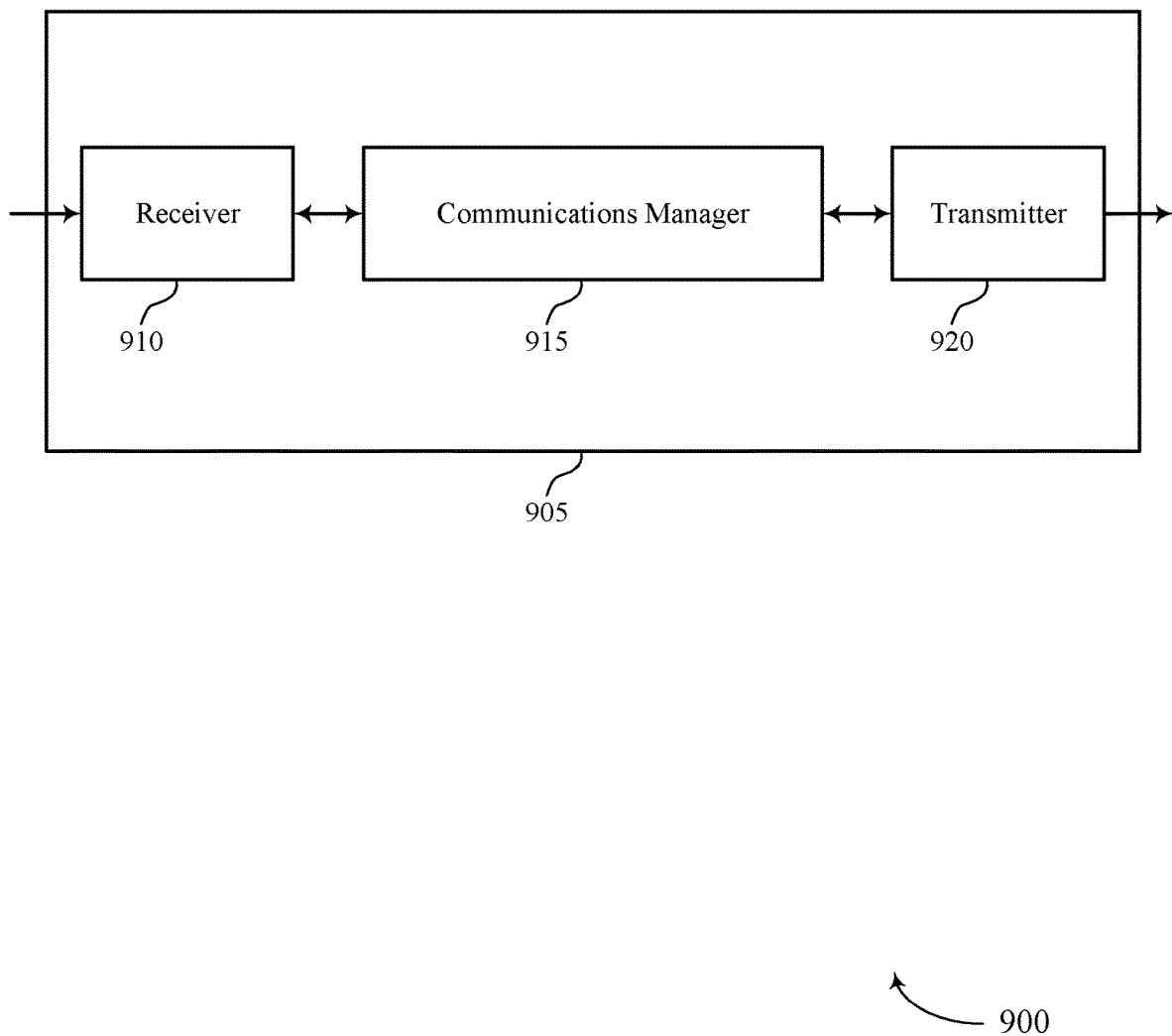
FIGS. 9 and 10 show block diagrams of devices that support group feedback techniques in wireless systems in accordance with aspects of the present disclosure.

FIG. 9 shows a block diagram 900 of a device 905 that supports group feedback techniques in wireless systems in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to group feedback techniques in wireless systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may monitor a set of time-frequency resources for one or more uplink transmissions from a set of user equipment (UEs) in communication with the base station, generate a group feedback message for the set of UEs, where the group feedback message includes an indication of whether an uplink transmission was received from each UE of the set of UEs based on the monitoring, and transmit the group feedback message to the set of UEs. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
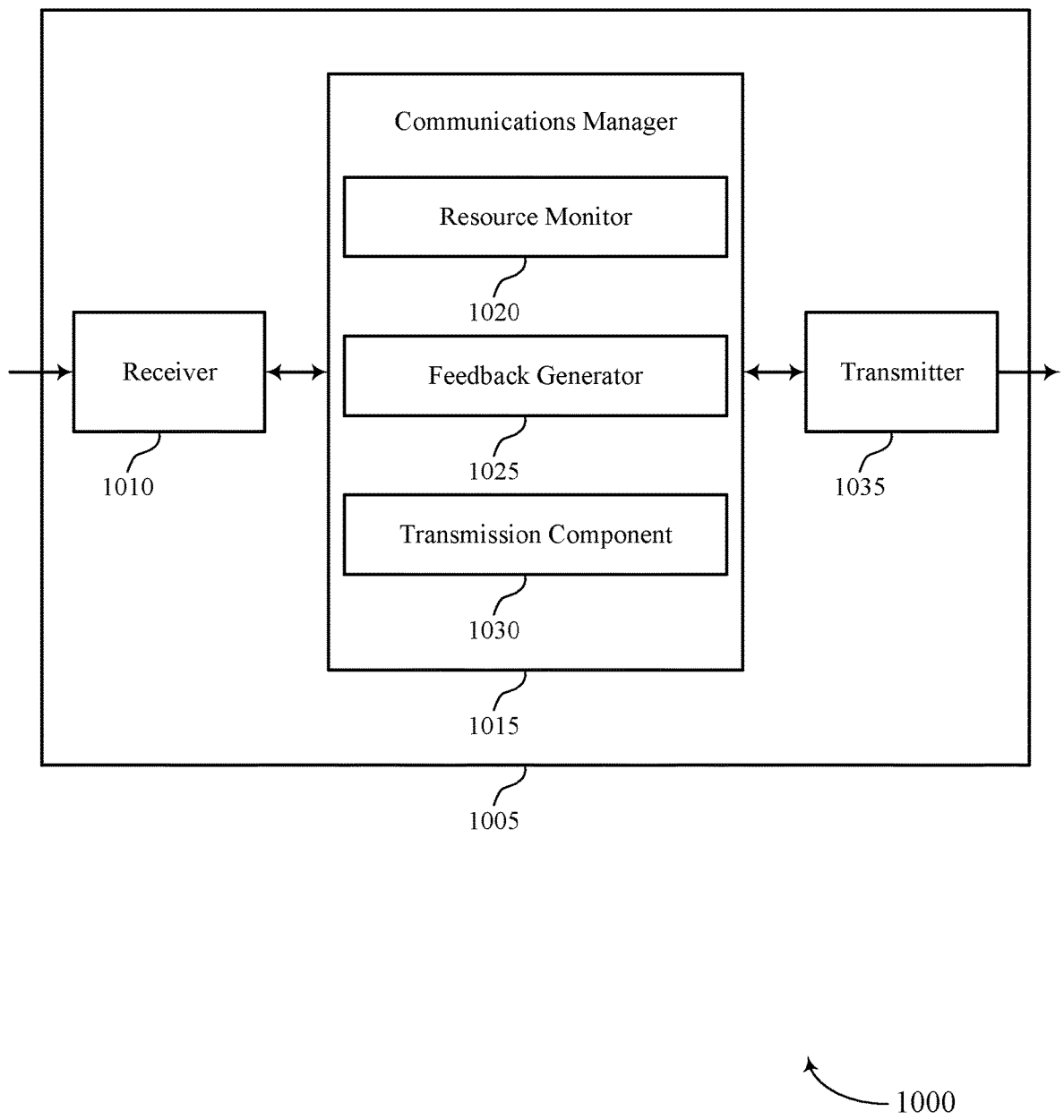

FIG. 10 shows a block diagram 1000 of a device 1005 that supports group feedback techniques in wireless systems in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to group feedback techniques in wireless systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a resource monitor 1020, a feedback generator 1025, and a transmission component 1030. The communications manager 1015 may be an example of aspects of the communications manager 1210 described herein.

The resource monitor 1020 may monitor a set of time-frequency resources for one or more uplink transmissions from a set of UEs in communication with the base station.

The feedback generator 1025 may generate a group feedback message for the set of UEs, where the group feedback message includes an indication of whether an uplink transmission was received from each UE of the set of UEs based on the monitoring.

The transmission component 1030 may transmit the group feedback message to the set of UEs.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
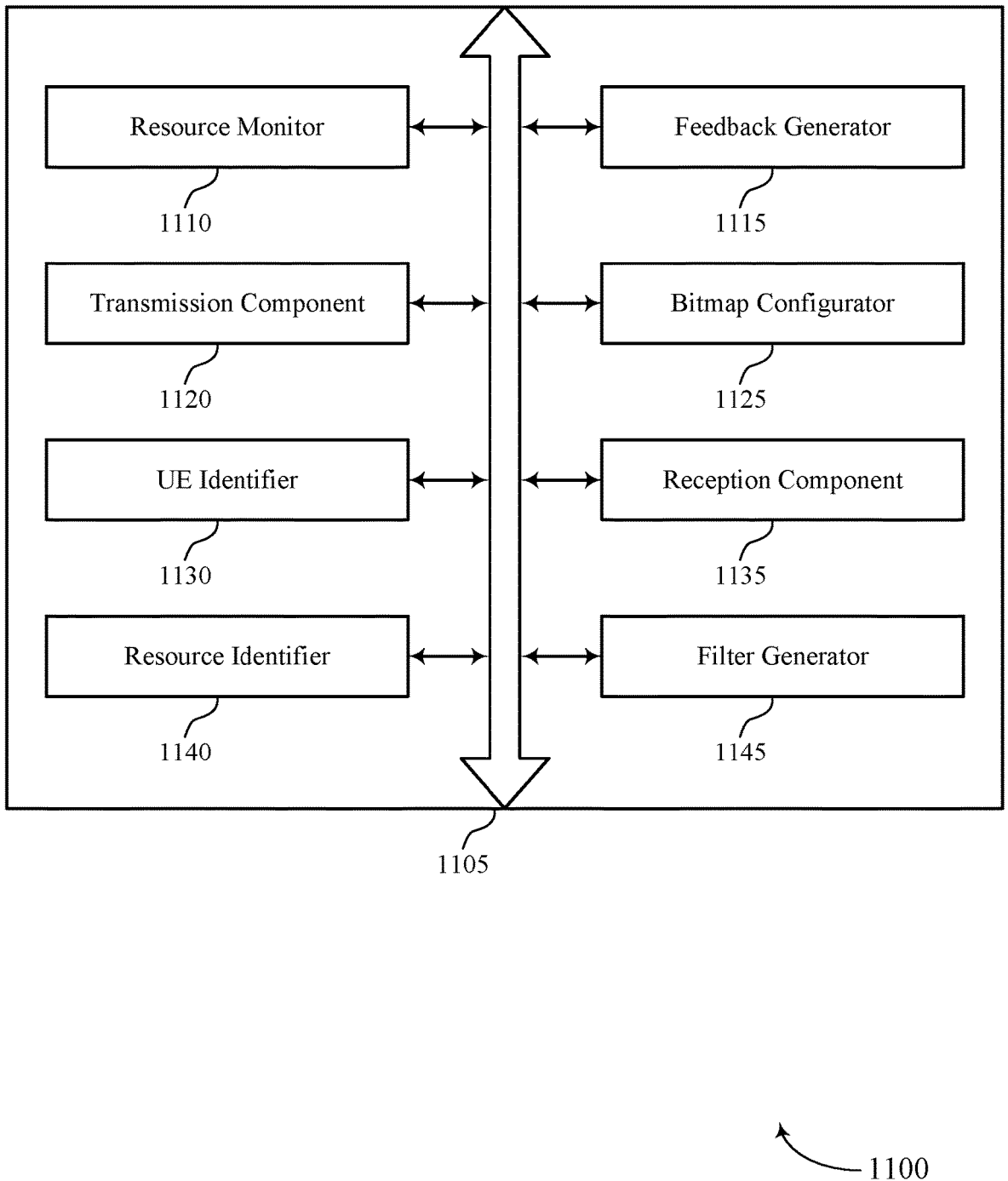
FIG. 11 shows a block diagram of a communications manager that supports group feedback techniques in wireless systems in accordance with aspects of the present disclosure.

FIG. 11 shows a block diagram 1100 of a communications manager 1105 that supports group feedback techniques in wireless systems in accordance with aspects of the present disclosure. The communications manager 1105 may be an example of aspects of a communications manager 915, a communications manager 1015, or a communications manager 1210 described herein. The communications manager 1105 may include a resource monitor 1110, a feedback generator 1115, a transmission component 1120, a bitmap configurator 1125, a UE identifier 1130, a reception component 1135, a resource identifier 1140, and a filter generator 1145. Each of these modules may communicate, directly or indirectly, with one another (e.g., via one or more buses).

The resource monitor 1110 may monitor a set of time-frequency resources for one or more uplink transmissions from a set of UEs in communication with the base station. In some examples, the resource monitor 1110 may determine that an uplink shared channel transmission was not received over the set of time-frequency resources from a first UE of the set of UEs based on the monitoring. In some examples, the resource monitor 1110 may monitor for multiple uplink transmissions from a first UE of the set of UEs. In some cases, the one or more uplink transmissions include one or more grant-free uplink transmissions.

The feedback generator 1115 may generate a group feedback message for the set of UEs, where the group feedback message includes an indication of whether an uplink transmission was received from each UE of the set of UEs based on the monitoring. In some examples, the feedback generator 1115 may generate a bitmap that indicates feedback information for each UE of the set of UEs, where each location of the bitmap corresponds to a respective UE of the set of UEs or multiple UEs of the set of UEs.

In some examples, the feedback generator 1115 may generate an ACK bitmap that indicates ACK feedback information for the set of UEs. In some examples, the feedback generator 1115 may generate a NACK bitmap that indicates NACK feedback information for the set of UEs. In some examples, the feedback generator 1115 may generate a detection bitmap that indicates whether detecting of the one or more uplink transmissions from the set of UEs was successful.

In some examples, the feedback generator 1115 may generate a first bitmap that indicates feedback information for each UE of the set of UEs, where each location of the first bitmap corresponds to a respective UE of the set of UEs. In some examples, the feedback generator 1115 may generate a second bitmap that indicates feedback information for each UE of the set of UEs, where each location of the second bitmap corresponds to a respective transmission from the set of UEs.

The transmission component 1120 may transmit the group feedback message to the set of UEs. In some examples, the transmission component 1120 may transmit a control message to the first UE, the control message indicating that the first location of the bitmap is configured for the first UE. In some examples, the transmission component 1120 may transmit a NACK indication to the first UE in the bitmap.

In some examples, the transmission component 1120 may transmit an uplink grant to the first UE, the uplink grant conveying a grant for retransmission. In some examples, the transmission component 1120 may transmit a control message to the first UE that indicates the second set of time-frequency resources. In some examples, the transmission component 1120 may transmit a downlink control channel that includes the group feedback message.

In some examples, the transmission component 1120 may transmit a control message to the set of UEs, where the control message indicates a UE configuration for an absence of the group feedback message. In some examples, the transmission component 1120 may transmit the downlink control channel according to an aggregation level configuration, where the aggregation level configuration is indicated via a control message, a maximum of a set of preconfigured aggregation levels, a default aggregation level, or any combination thereof.

In some examples, the transmission component 1120 may DCI of the downlink control channel carries the group feedback message. In some examples, the transmission component 1120 may scramble the DCI using a mask common to the set of UEs or associated with a cell ID. In some examples, the transmission component 1120 may transmit a downlink shared channel that includes the group feedback message.

In some examples, the transmission component 1120 may transmit a control message to the set of UEs, the control message indicating the set of transmission resources for the downlink shared channel. In some examples, the transmission component 1120 may transmit DCI that schedules transmission of the group feedback message via the downlink shared channel. In some examples, the transmission component 1120 may include an indicator bit in the DCI for indicating the group feedback message or a data transmission.

In some examples, the transmission component 1120 may include an indicator bit in the DCI for indicating the group feedback message is carried in the DCI or the downlink shared channel. In some examples, the transmission component 1120 may transmission parameters used for transmitting the DCI indicates the group feedback message or a data transmission. In some examples, the transmission component 1120 may transmission parameters used for transmitting the DCI indicates whether the group feedback information is carried in the DCI or the downlink shared channel.

In some examples, transmission component 1120 may transmit the group feedback message to the first UE, where the group feedback message includes a bitmap that indicates feedback for each of the multiple uplink transmissions from the first UE. In some examples, the transmission component 1120 may transmit a respective hash indication to each UE of the set of UEs. In some examples, the transmission component 1120 may transmit the group feedback message according to a hopping scheme, where the hopping scheme is a time hopping scheme or a frequency hopping scheme.

In some examples, the transmission component 1120 may transmit a control message indicating a hopping sequence associated with the hopping scheme. In some cases, the downlink control channel is transmitted according to a set of transmission parameters different from other downlink control channels. In some cases, the set of transmission parameters includes a control resource set, a search space, a monitoring occasion, a set of configured control resources, or any combination thereof. In some cases, a size of the DCI corresponds to one of a fallback size, a preconfigured format size, a control configurable size, or a variable size based on the group feedback message.

In some cases, the DCI schedules transmission of a data transmission via the downlink shared channel. In some cases, the transmission parameters include a zero-allocation indication or a MCS index. In some cases, each location of the bitmap corresponds to feedback for a respective uplink transmission of the multiple uplink transmissions.

The bitmap configurator 1125 may configure a first location of the bitmap for a first UE of the set of UEs. In some examples, the bitmap configurator 1125 may determine a location within the bitmap for feedback for the first UE based on the uplink shared channel transmission. In some examples, the bitmap configurator 1125 may determine the location within the bitmap based on a frequency allocation for the uplink shared channel, a time allocation for the uplink shared channel, a BWP associated with the uplink shared channel, a transmission signature of the uplink shared channel, a UE ID of the first UE, or any combination thereof.

In some examples, the bitmap configurator 1125 may determine each location based on an index of the respective uplink transmission, where the index is based on a resource allocation of the respective uplink transmission, a multi-input multi-output layer index of the respective uplink transmission, a non-orthogonal multiple access parameter of the respective uplink transmission, a spreading code index of the respective uplink transmission.

The UE identifier 1130 may identify a UE ID for a first UE of the set of UEs, where a first location of the bitmap is configured for the first UE based on the UE ID. In some examples, the UE identifier 1130 may calculate a hash function or a modulo function based on the UE ID, where the first location is based on the hash function or the modulo function. In some cases, the UE ID includes a C-RNTI or a CS-RNTI.

The reception component 1135 may receive an uplink shared channel transmission from a first UE of the set of UEs based on the monitoring. In some examples, the reception component 1135 may receive a retransmission from the first UE over the set of time-frequency resources in response to the NACK indication. In some examples, the reception component 1135 may receive the retransmission from the first UE in response to the uplink grant.

In some examples, the reception component 1135 may receive a retransmission from the first UE over a second set of time-frequency resources different from the set of time-frequency resources in response to the NACK indication. In some examples, the reception component 1135 may receive a retransmission from the first UE in response to the NACK indication, where the retransmission is based on a BWP associated with the uplink shared channel transmission. In some cases, the second set of time-frequency resources may be based on a location of the NACK indication within the bitmap.

The resource identifier 1140 may identify a set of transmission resources for the downlink shared channel. The filter generator 1145 may generate a bloom filter that indicates feedback information for each UE of the set of UEs, where the bloom filter includes a vector of a set of hashes for the set of UEs. In some examples, the filter generator 1145 may generate each hash of the set of hashes for a respective UE of the set of UEs. In some examples, the filter generator 1145 may generate a second bloom filter that indicates NACK information for each UE of the set of UEs.

Figure 12:
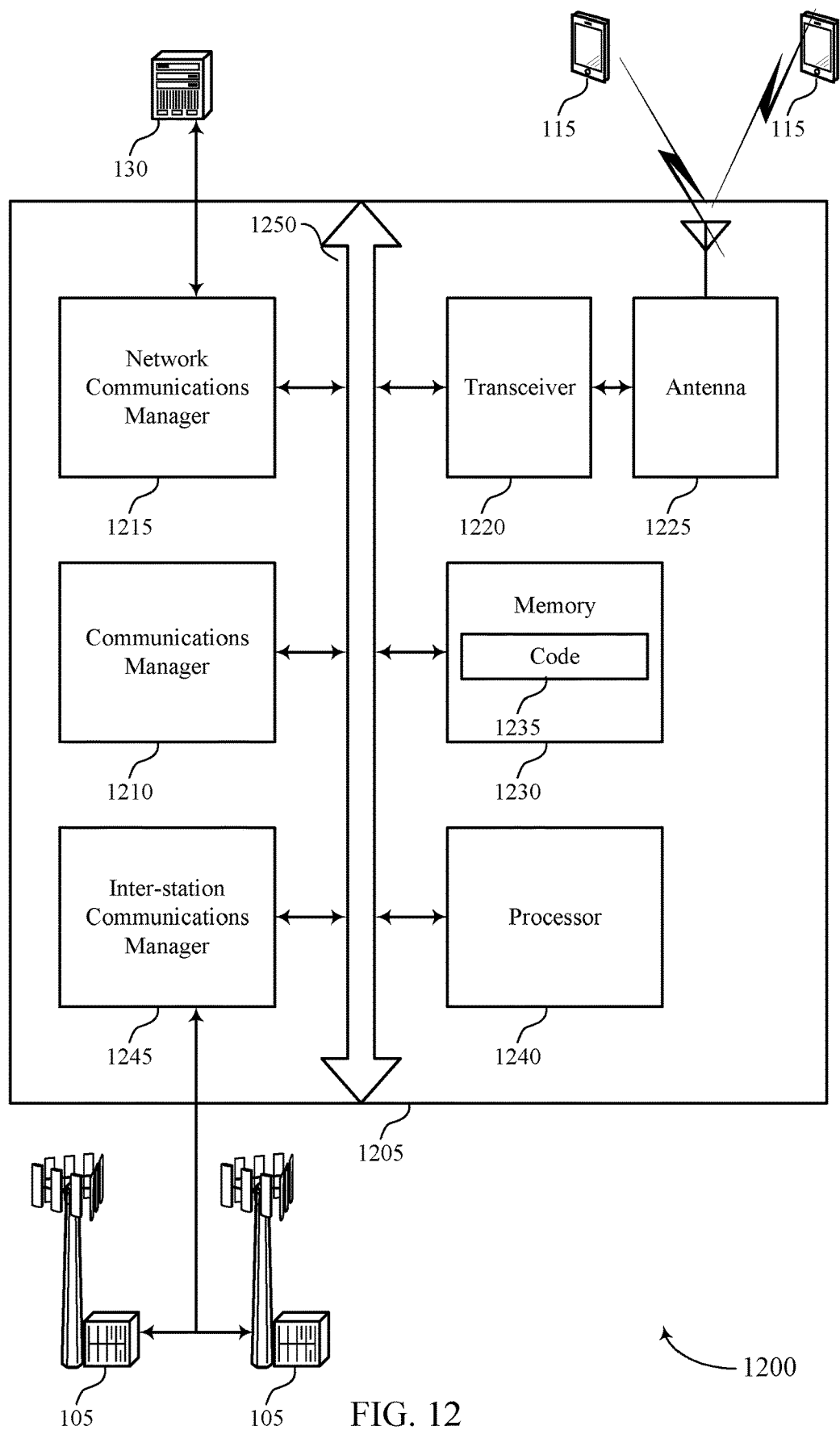
FIG. 12 shows a diagram of a system including a device that supports group feedback techniques in wireless systems in accordance with aspects of the present disclosure.

FIG. 12 shows a diagram of a system 1200 including a device 1205 that supports group feedback techniques in wireless systems in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may monitor a set of time-frequency resources for one or more uplink transmissions from a set of UEs in communication with the base station, generate a group feedback message for the set of UEs, where the group feedback message includes an indication of whether an uplink transmission was received from each UE of the set of UEs based on the monitoring, and transmit the group feedback message to the set of UEs.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting group feedback techniques in wireless systems).

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
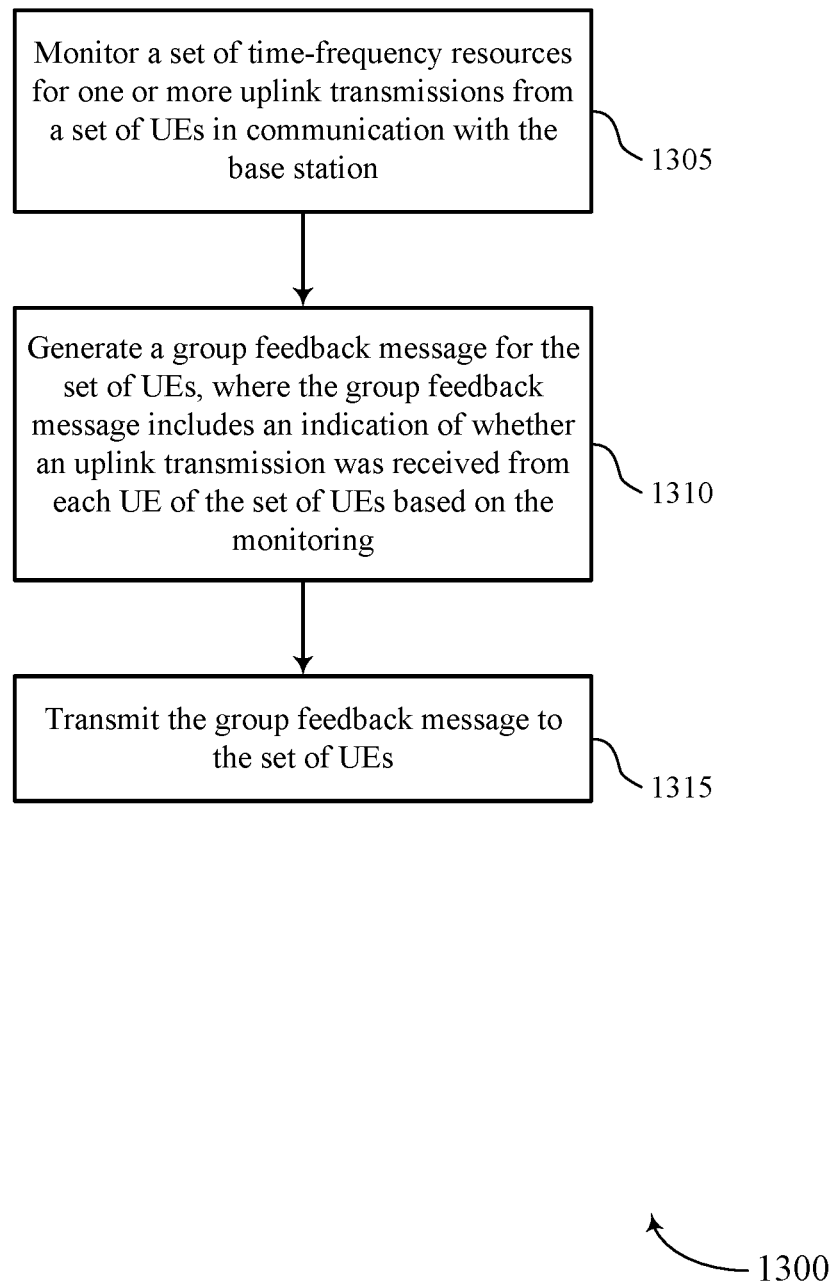
FIGS. 13 through 16 show flowcharts illustrating methods that support group feedback techniques in wireless systems in accordance with aspects of the present disclosure.

FIG. 13 shows a flowchart illustrating a method 1300 that supports group feedback techniques in wireless systems in accordance with aspects of the present disclosure. The operations of method 1300 may be implemented by a base station 105 or its components as described herein. For example, the operations of method 1300 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1305, the base station may monitor a set of time-frequency resources for one or more uplink transmissions from a set of UEs in communication with the base station. The operations of 1305 may be performed according to the methods described herein. In some examples, aspects of the operations of 1305 may be performed by a resource monitor as described with reference to FIGS. 9 through 12.

At 1310, the base station may generate a group feedback message for the set of UEs, where the group feedback message includes an indication of whether an uplink transmission was received from each UE of the set of UEs based on the monitoring. The operations of 1310 may be performed according to the methods described herein. In some examples, aspects of the operations of 1310 may be performed by a feedback generator as described with reference to FIGS. 9 through 12.

At 1315, the base station may transmit the group feedback message to the set of UEs. The operations of 1315 may be performed according to the methods described herein. In some examples, aspects of the operations of 1315 may be performed by a transmission component as described with reference to FIGS. 9 through 12.

Figure 14:
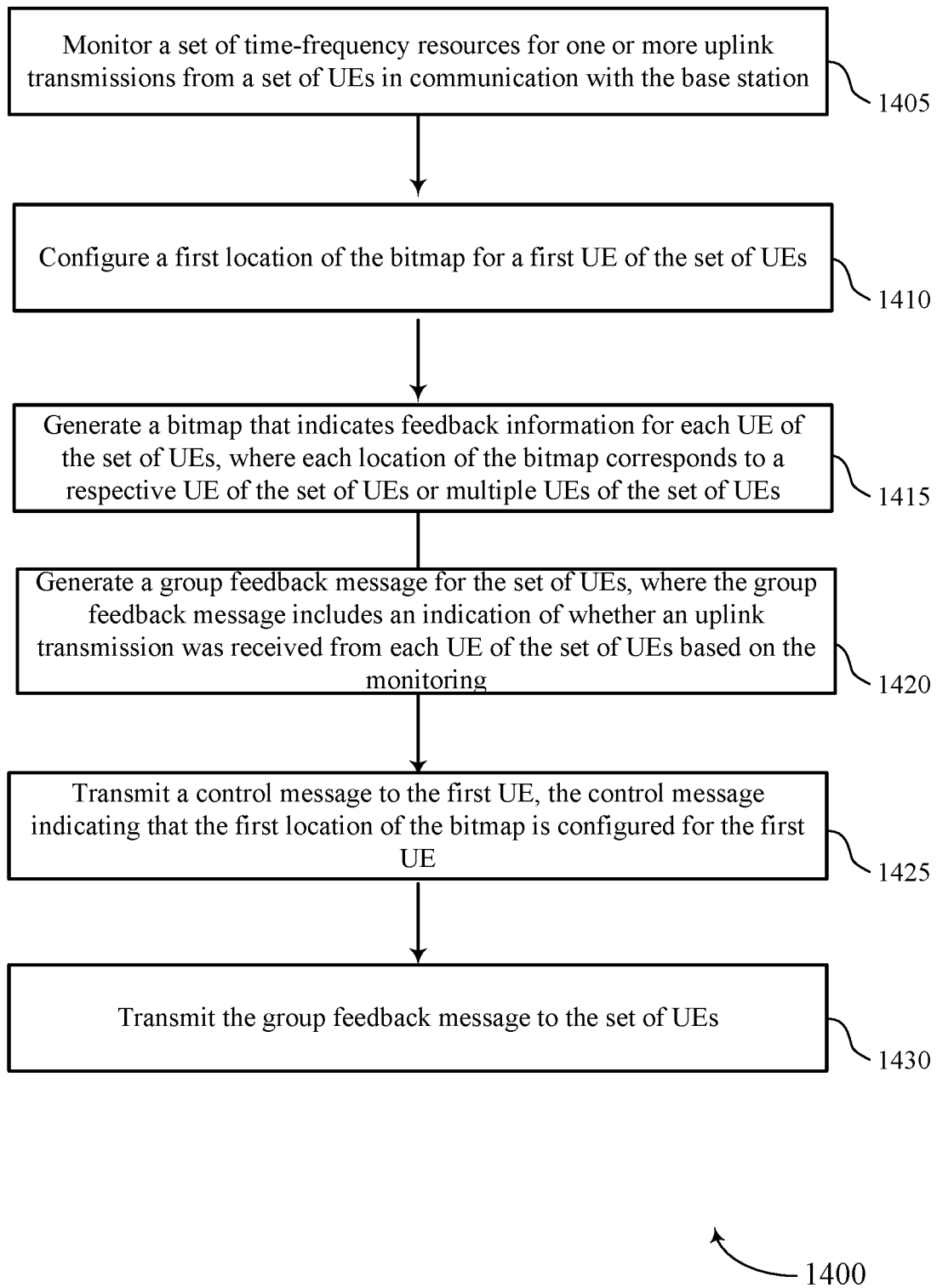

FIG. 14 shows a flowchart illustrating a method 1400 that supports group feedback techniques in wireless systems in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1405, the base station may monitor a set of time-frequency resources for one or more uplink transmissions from a set of UEs in communication with the base station. The operations of 1405 may be performed according to the methods described herein. In some examples, aspects of the operations of 1405 may be performed by a resource monitor as described with reference to FIGS. 9 through 12.

At 1410, the base station may configure a first location of the bitmap for a first UE of the set of UEs. The operations of 1410 may be performed according to the methods described herein. In some examples, aspects of the operations of 1410 may be performed by a feedback generator as described with reference to FIGS. 9 through 12.

At 1415, the base station may generate a bitmap that indicates feedback information for each UE of the set of UEs, where each location of the bitmap corresponds to a respective UE of the set of UEs or multiple UEs of the set of UEs. The operations of 1415 may be performed according to the methods described herein. In some examples, aspects of the operations of 1415 may be performed by a transmission component as described with reference to FIGS. 9 through 12.

At 1420, the base station may generate a group feedback message for the set of UEs, where the group feedback message includes an indication of whether an uplink transmission was received from each UE of the set of UEs based on the monitoring. The operations of 1420 may be performed according to the methods described herein. In some examples, aspects of the operations of 1420 may be performed by a feedback generator as described with reference to FIGS. 9 through 12.

At 1425, the base station may transmit a control message to the first UE, the control message indicating that the first location of the bitmap is configured for the first UE. The operations of 1425 may be performed according to the methods described herein. In some examples, aspects of the operations of 1425 may be performed by a bitmap configurator as described with reference to FIGS. 9 through 12.

At 1430, the base station may transmit the group feedback message to the set of UEs. The operations of 1430 may be performed according to the methods described herein. In some examples, aspects of the operations of 1430 may be performed by a transmission component as described with reference to FIGS. 9 through 12.

Figure 15:
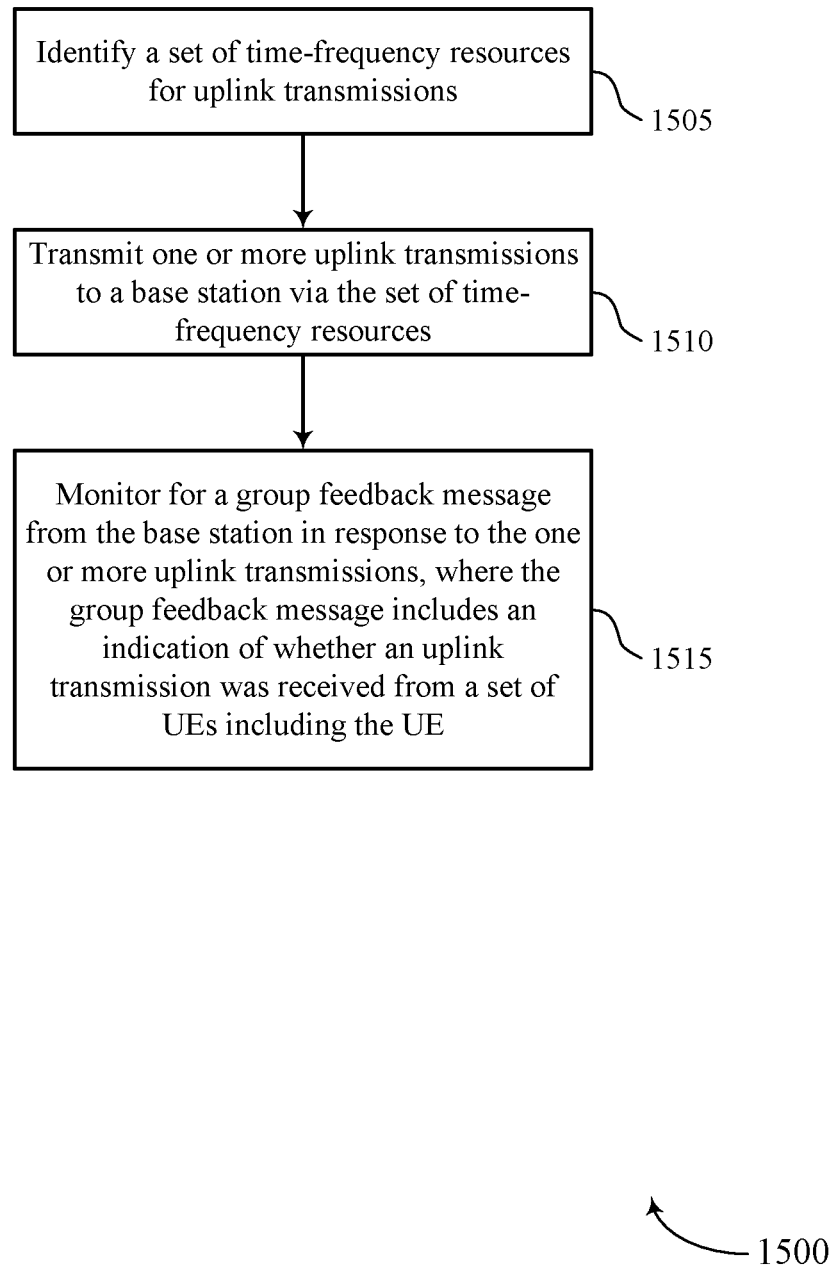

FIG. 15 shows a flowchart illustrating a method 1500 that supports group feedback techniques in wireless systems in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify a set of time-frequency resources for uplink transmissions. The operations of 1505 may be performed according to the methods described herein. In some examples, aspects of the operations of 1505 may be performed by a resource identifier as described with reference to FIGS. 5 through 8.

At 1510, the UE may transmit one or more uplink transmissions to a base station via the set of time-frequency resources. The operations of 1510 may be performed according to the methods described herein. In some examples, aspects of the operations of 1510 may be performed by a transmission component as described with reference to FIGS. 5 through 8.

At 1515, the UE may monitor for a group feedback message from the base station in response to the one or more uplink transmissions, where the group feedback message includes an indication of whether an uplink transmission was received from a set of UEs including the UE. The operations of 1515 may be performed according to the methods described herein. In some examples, aspects of the operations of 1515 may be performed by a resource monitor as described with reference to FIGS. 5 through 8.

Figure 16:
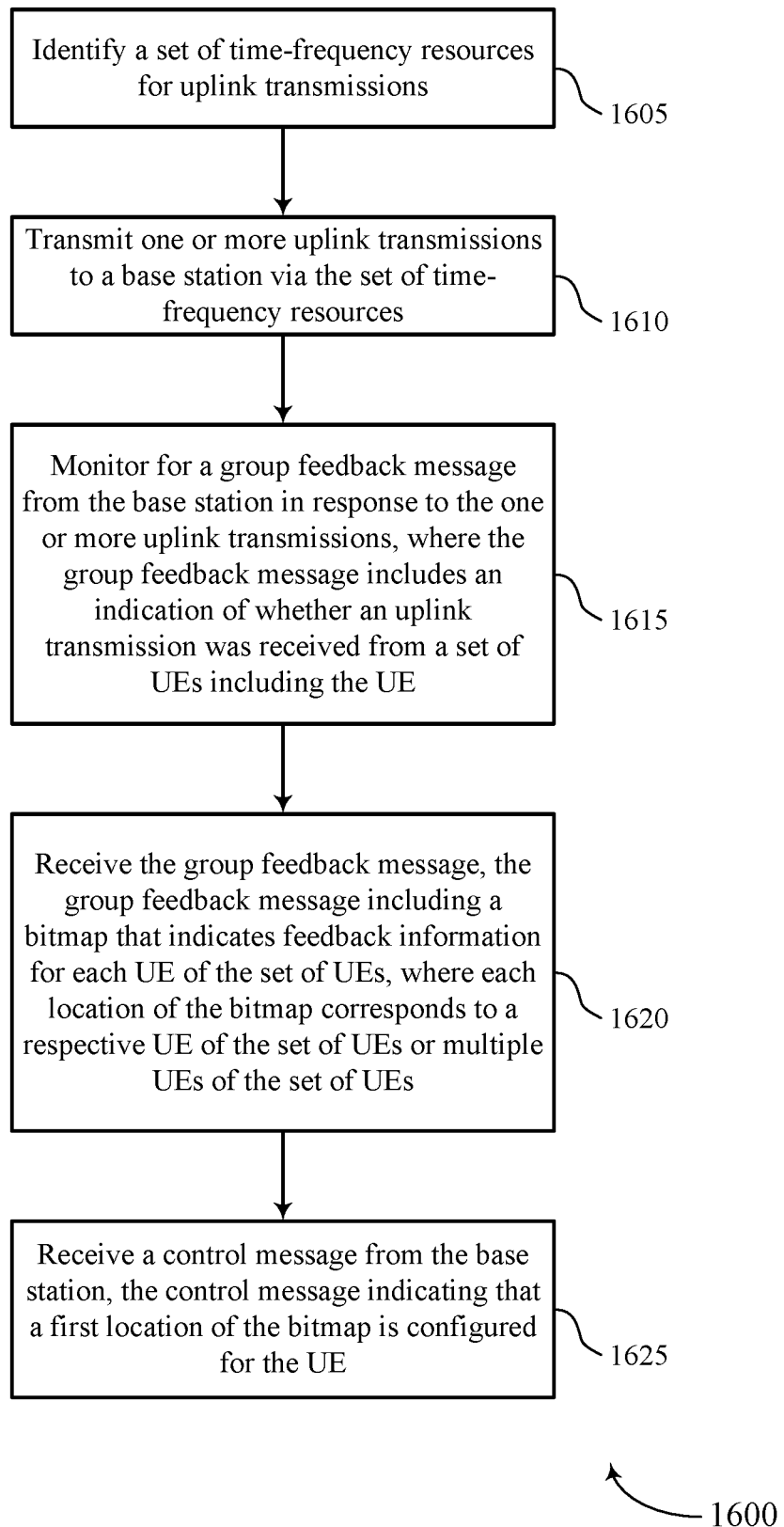

FIG. 16 shows a flowchart illustrating a method 1600 that supports group feedback techniques in wireless systems in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may identify a set of time-frequency resources for uplink transmissions. The operations of 1605 may be performed according to the methods described herein. In some examples, aspects of the operations of 1605 may be performed by a resource identifier as described with reference to FIGS. 5 through 8.

At 1610, the UE may transmit one or more uplink transmissions to a base station via the set of time-frequency resources. The operations of 1610 may be performed according to the methods described herein. In some examples, aspects of the operations of 1610 may be performed by a transmission component as described with reference to FIGS. 5 through 8.

At 1615, the UE may monitor for a group feedback message from the base station in response to the one or more uplink transmissions, where the group feedback message includes an indication of whether an uplink transmission was received from a set of UEs including the UE. The operations of 1615 may be performed according to the methods described herein. In some examples, aspects of the operations of 1615 may be performed by a resource monitor as described with reference to FIGS. 5 through 8.

At 1620, the UE may receive the group feedback message, the group feedback message including a bitmap that indicates feedback information for each UE of the set of UEs, where each location of the bitmap corresponds to a respective UE of the set of UEs or multiple UEs of the set of UEs. The operations of 1620 may be performed according to the methods described herein. In some examples, aspects of the operations of 1620 may be performed by a reception component as described with reference to FIGS. 5 through 8.

At 1625, the UE may receive a control message from the base station, the control message indicating that a first location of the bitmap is configured for the UE. The operations of 1625 may be performed according to the methods described herein. In some examples, aspects of the operations of 1625 may be performed by a reception component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device, comprising:
    transmitting, to a first user equipment (UE) of a plurality of UEs in communication with the network device, a radio resource control (RRC) configuration message indicating a first location within a bitmap for feedback for the first UE, the feedback associated with grant-free uplink transmissions for the first UE;
    monitoring a set of time-frequency resources for one or more grant-free uplink transmissions from the plurality of UEs in communication with the network device;
    generating a group feedback message for the plurality of UEs, wherein the group feedback message comprises an indication of whether a respective grant-free uplink transmission was received from each UE of the plurality of UEs based at least in part on the monitoring, wherein generating the group feedback message comprises generating the bitmap that indicates feedback for each UE of the plurality of UEs, wherein the bitmap is a first type of feedback bitmap of multiple types of feedback bitmaps, and wherein the first location within the bitmap includes feedback for the first UE for the respective grant-free uplink transmission in accordance with the RRC configuration message; and transmitting, to the plurality of UEs, the group feedback message comprising the feedback bitmap indicating the feedback for each UE of the plurality of UEs.

2. The method of claim 1, wherein transmitting the group feedback message comprises:

transmitting a downlink shared channel that comprises the group feedback message.

3. The method of claim 2, further comprising:

transmitting a control message to the plurality of UEs, the control message indicating a set of transmission resources for the downlink shared channel;

transmitting downlink control information (DCI) that schedules transmission of the group feedback message via the downlink shared channel; and scrambling the DCI using a mask common to the plurality of UEs or associated with a cell identifier (ID).

4. The method of claim 1, wherein each location of the bitmap corresponds to a respective UE of the plurality of UEs or multiple UEs of the plurality of UEs, wherein the first location of the bitmap is configured for the first UE based at least in part on a UE identifier (ID) for the first UE.

5. The method of claim 4, wherein the UE ID comprises a cell radio network temporary identifier (C-RNTI) or a configured scheduling radio network temporary identifier (CS-RNTI).

6. The method of claim 4, further comprising:

receiving a grant-free uplink shared channel transmission from a second UE of the plurality of UEs based at least in part on the monitoring; and determining a second location within the bitmap for feedback for the second UE based at least in part on a characteristic of the grant-free uplink shared channel transmission.

7. The method of claim 6, further comprising:

determining the second location within the bitmap based at least in part on a frequency allocation for the grant-free uplink shared channel transmission, a time allocation for the grant-free uplink shared channel transmission, a bandwidth part (BWP) associated with the grant-free uplink shared channel transmission, a transmission signature of the grant-free uplink shared channel transmission, a second UE ID of the second UE, or any combination thereof.

8. The method of claim 4, further comprising:

determining that grant-free uplink shared channel transmission was not received over the set of time-frequency resources from a second UE of the plurality of UEs based at least in part on the monitoring;

transmitting a negative acknowledgment (NACK) indication to the second UE in the bitmap; and receiving a retransmission from the second UE over a second set of time-frequency resources different from the set of time-frequency resources in response to the NACK indication, wherein the second set of time-frequency resources is based at least in part on a location of the NACK indication within the bitmap.

9. The method of claim 1, wherein a second bitmap comprises a negative ACK (NACK) bitmap that indicates NACK feedback information for each of the plurality of UEs.

10. The method of claim 1, further comprising:

monitoring for the one or more grant-free uplink transmissions from the first UE of the plurality of UEs; and transmitting the group feedback message to the first UE, wherein the group feedback message comprises the bitmap that indicates feedback for each of the one or more grant-free uplink transmissions.

11. The method of claim 1, wherein generating the group feedback message comprises:

generating a hash-based set membership operation that indicates feedback information for each UE of the plurality of UEs, wherein the hash-based set membership operation comprises a vector of a set of hashes for the plurality of UEs.

12. The method of claim 1, wherein transmitting the group feedback message comprises:

transmitting the group feedback message according to a hopping scheme, wherein the hopping scheme is a time hopping scheme or a frequency hopping scheme.

13. A method for wireless communications at a user equipment (UE), comprising:

receiving, from a network device, a radio resource control (RRC) configuration message indicating a first location within a bitmap for feedback for the UE, the feedback associated with grant-free uplink transmissions for the UE;

transmitting one or more grant-free uplink transmissions to the network device via a set of time-frequency resources for grant-free transmissions; and monitoring for a group feedback message from the network device in response to the one or more grant-free uplink transmissions, wherein the group feedback message comprises an indication of whether a respective grant-free uplink transmission was received from each of a plurality of UEs including the UE, wherein the indication comprises the bitmap that indicates feedback for each UE of the plurality of UEs, wherein the bitmap is a first type of feedback bitmap of multiple types of feedback bitmaps, and wherein the first location within the bitmap includes feedback for the UE for the respective grant-free uplink transmission in accordance with the RRC configuration message.

14. The method of claim 13, wherein monitoring for the group feedback message comprises:

receiving a downlink shared channel that comprises the group feedback message.

15. The method of claim 13, wherein monitoring for the group feedback message comprises:

receiving the group feedback message, wherein the bitmap indicates feedback information for each UE of the plurality of UEs, wherein each location of the bitmap corresponds to a respective UE of the plurality of UEs or multiple UEs of the plurality of UEs; and determining a location of the bitmap configured for the UE based at least in part on a UE ID for the UE.

16. The method of claim 15, wherein the UE ID comprises a cell radio network temporary identifier (C-RNTI) or a configured scheduling radio network temporary identifier (CS-RNTI).

17. The method of claim 15, further comprising:

transmitting the one or more grant-free uplink transmissions via an uplink shared channel; and determining the location within the bitmap based at least in part on a frequency allocation for the uplink shared channel, a time allocation for the uplink shared channel, a bandwidth part (BWP) associated with the uplink shared channel, a transmission signature of the uplink shared channel, the UE ID, or any combination thereof.

18. The method of claim 15, further comprising:
receiving a negative acknowledgment (NACK) indication from the network device in the bitmap; and
transmitting a first retransmission of the one or more grant-free uplink transmissions to the network device over the set of time-frequency resources in response to the NACK indication.

19. The method of claim 18, further comprising:
transmitting a second retransmission of the one or more grant-free uplink transmissions to the network device over a second set of time-frequency resources different from the set of time-frequency resources in response to the NACK indication, wherein the second set of time-frequency resources is based at least in part on the location of the NACK indication within the bitmap.

20. The method of claim 13, wherein a second bitmap comprises a negative ACK (NACK) bitmap that indicates NACK feedback information for the plurality of UEs.

21. The method of claim 13, wherein monitoring for the group feedback message comprises:
receiving a downlink shared channel that comprises the group feedback message;
receiving a control message from the network device, the control message indicating a set of resources for the downlink shared channel; and
receiving downlink control information (DCI) that schedules transmission of the group feedback message via the downlink shared channel, wherein the DCI is scrambled using a mask common to the plurality of UEs or associated with a cell identifier (ID).

22. The method of claim 21, wherein the DCI schedules transmission of a data transmission via the downlink shared channel.

23. The method of claim 14, further comprising:
receiving downlink control information (DCI) that schedules transmission of the group feedback message via the downlink shared channel, wherein the DCI is scrambled using a mask common to the plurality of UEs or associated with a cell identifier (ID).

24. The method of claim 13, wherein monitoring for the group feedback message comprises:
receiving the group feedback message from the network device, wherein the group feedback message comprises the bitmap that indicates feedback for each of the one or more grant-free uplink transmissions.

25. The method of claim 13, wherein monitoring for the group feedback message comprises:
receiving the group feedback message comprising a hash-based set membership operation that indicates feedback information for each UE of the plurality of UEs, wherein the hash-based set membership operation comprises a vector of a set of hashes for the plurality of UEs, wherein the feedback information for the UE of the plurality of UEs is based at least in part on a hash of the vector that corresponds to the UE.

26. The method of claim 13, wherein monitoring for the group feedback message comprises:
receiving the group feedback message according to a hopping scheme, wherein the hopping scheme is a time hopping scheme or a frequency hopping scheme.

27. An apparatus for wireless communications at a network device, comprising:
one or more processors;
one or more memories coupled with the one or more processors; and
instructions stored in the one or more memories and executable by the one or more processors to cause the apparatus to:
transmit, to a first user equipment (UE) of a plurality of UEs in communication with the network device, a radio resource control (RRC) configuration message indicating a first location within a bitmap for feedback for the first UE, the feedback associated with grant-free uplink transmissions for the first UE;
monitor a set of time-frequency resources for one or more grant-free uplink transmissions from the plurality of UEs in communication with the network device;
generate a group feedback message for the plurality of UEs, wherein the group feedback message comprises an indication of whether a respective grant-free uplink transmission was received from each UE of the plurality of UEs based at least in part on the monitoring, wherein generating the group feedback message comprises generating the bitmap that indicates feedback for each UE of the plurality of UEs, wherein the bitmap is a first type of feedback bitmap of multiple types of feedback bitmaps, and wherein the first location within the bitmap includes feedback for the first UE for the respective grant-free uplink transmission in accordance with the RRC configuration message; and
transmit, to the plurality of UEs, the group feedback message comprising the feedback bitmap indicating the feedback for each UE of the plurality of UEs.

28. An apparatus for wireless communications at a user equipment (UE), comprising:
one or more processors;
one or more memories coupled with the one or more processors; and
instructions stored in the one or more memories and executable by the one or more processors to cause the apparatus to:
receive, from a network device, a radio resource control (RRC) configuration message indicating a first location within a bitmap for feedback for the UE, the feedback associated with grant-free uplink transmissions for the UE;
transmit one or more grant-free uplink transmissions to the network device via a set of time-frequency resources for grant-free transmissions; and
monitor for a group feedback message from the network device in response to the one or more grant-free uplink transmissions, wherein the group feedback message comprises an indication of whether a respective grant-free uplink transmission was received from each of a plurality of UEs including the UE, wherein the indication comprises the bitmap that indicates feedback for each UE of the plurality of UEs, wherein the bitmap is a first type of feedback bitmap of multiple types of feedback bitmaps, and wherein the first location within the bitmap includes feedback for the UE for the respective grant-free uplink transmission in accordance with the RRC configuration message.

* * * * *